(12) United States Patent
Yamamura et al.

(10) Patent No.: US 10,267,579 B2
(45) Date of Patent: Apr. 23, 2019

(54) METHOD AND APPARATUS FOR IMPROVING THERMAL EFFICIENCY OF HEATING DEVICE

(71) Applicant: Japan Ultra-high Temperature Materials Research Center, Ube-shi, Yamaguchi (JP)

(72) Inventors: Takemi Yamamura, Ube (JP); Narihito Nakagawa, Ube (JP); Terumi Hisayuki, Ube (JP); Motohide Toda, Ube (JP); Hironaga Iguchi, Ube (JP); Yoshikazu Matsumura, Yamaguchi (JP); Kiyohito Okamura, Ube (JP)

(73) Assignee: JAPAN ULTRA-HIGH TEMPERATURE MATERIALS RESEARCH CENTER, Yamaguchi (JP)

( * ) Notice: Subject to any disclaimer, the term of this patent is extended or adjusted under 35 U.S.C. 154(b) by 533 days.

(21) Appl. No.: 14/910,714

(22) PCT Filed: May 26, 2014

(86) PCT No.: PCT/JP2014/063849
§ 371 (c)(1),
(2) Date: Feb. 8, 2016

(87) PCT Pub. No.: WO2015/019681
PCT Pub. Date: Feb. 12, 2015

(65) Prior Publication Data
US 2016/0187078 A1 Jun. 30, 2016

(30) Foreign Application Priority Data

Aug. 9, 2013 (JP) .................................. 2013-166612

(51) Int. Cl.
*F28F 13/00* (2006.01)
*F27D 17/00* (2006.01)
(Continued)

(52) U.S. Cl.
CPC .............. *F28F 13/00* (2013.01); *B32B 18/00* (2013.01); *C04B 35/571* (2013.01);
(Continued)

(58) Field of Classification Search
CPC ........ F23J 15/02; F23J 15/022; F23J 2219/40; F23J 3/04; F23J 2217/20; F27D 17/00;
(Continued)

(56) References Cited

U.S. PATENT DOCUMENTS 4,434,004 A * 2/1984 Ratschat ............ B01D 53/0407
165/104.21
4,666,403 A * 5/1987 Smith ........................ C21B 9/14
432/180

(Continued)

FOREIGN PATENT DOCUMENTS

EP  0635692 A1 * 1/1995 ............. C03B 5/237
JP  3136873 U  11/2007
(Continued)

OTHER PUBLICATIONS

International Search Report dated Jul. 29, 2014, issued in counterpart International Application No. PCT/JP2014/063849 (2 pages).

*Primary Examiner* — Gregory A Wilson
(74) *Attorney, Agent, or Firm* — Westerman, Hattori, Daniels & Adrian, LLP

(57) ABSTRACT

A method for improving thermal efficiency of a heating device that reduces an amount of heat flowing out from a heating device 11 to the outside by installing a heat-resistant inorganic conjugated molded product 16 in and along a pathway 15 for heated gas generated from the heating device (Continued)

11 without interrupting the flow of heated gas passing the pathway 15, heating the inorganic conjugated molded product 16 with the heated gas, and putting radiation heat from the heated inorganic conjugated molded product 16 back into the heating device 11, the inorganic conjugated molded product 16 being provided with an interior layer and an exterior layer, the exterior layer consisting of a coverture for inorganic materials that protects the interior layer from heated gas.

59 Claims, 6 Drawing Sheets

(51) Int. Cl.
<table>
<tr><td>F27D 1/04</td><td>(2006.01)</td></tr>
<tr><td>B32B 18/00</td><td>(2006.01)</td></tr>
<tr><td>C04B 35/571</td><td>(2006.01)</td></tr>
<tr><td>C04B 35/573</td><td>(2006.01)</td></tr>
<tr><td>C04B 35/589</td><td>(2006.01)</td></tr>
<tr><td>C04B 35/593</td><td>(2006.01)</td></tr>
<tr><td>C04B 35/628</td><td>(2006.01)</td></tr>
<tr><td>C04B 35/80</td><td>(2006.01)</td></tr>
</table>

(52) U.S. Cl.
CPC .......... *C04B 35/573* (2013.01); *C04B 35/589* (2013.01); *C04B 35/593* (2013.01); *C04B 35/62847* (2013.01); *C04B 35/62849* (2013.01); *C04B 35/62852* (2013.01); *C04B 35/62868* (2013.01); *C04B 35/62871* (2013.01); *C04B 35/62873* (2013.01); *C04B 35/62892* (2013.01); *C04B 35/62894* (2013.01); *C04B 35/80* (2013.01); *F27D 1/042* (2013.01); *F27D 17/002* (2013.01); *F27D 17/004* (2013.01); *C04B 2235/522* (2013.01); *C04B 2235/5228* (2013.01); *C04B 2235/5244* (2013.01); *C04B 2235/5248* (2013.01); *C04B 2235/5445* (2013.01); *C04B 2235/616* (2013.01); *C04B 2235/785* (2013.01); *C04B 2235/85* (2013.01); *C04B 2235/94* (2013.01); *C04B 2237/365* (2013.01); *C04B 2237/368* (2013.01); *C04B 2237/38* (2013.01); *C04B 2237/385* (2013.01); *F28F 2255/14* (2013.01); *F28F 2270/00* (2013.01)

(58) Field of Classification Search
CPC ........ F27D 17/002; F23D 14/58; F28F 13/00; F28F 2255/14; F28F 2270/00; F23B 80/04; F22B 37/06; B22C 9/00; F27B 3/19; F27B 7/33; F27B 9/39
See application file for complete search history.

(56) References Cited

U.S. PATENT DOCUMENTS

<table>
<tr><td>4,966,101 A *</td><td>10/1990</td><td>Maeda</td><td>B01J 8/1827<br>110/245</td></tr>
<tr><td>6,572,370 B1 *</td><td>6/2003</td><td>Hampden</td><td>F27D 17/004<br>165/901</td></tr>
<tr><td>9,863,708 B2 *</td><td>1/2018</td><td>Zivanovic</td><td>F27D 9/00</td></tr>
<tr><td>2011/0008214 A1 *</td><td>1/2011</td><td>Haas</td><td>B01D 53/74<br>422/105</td></tr>
<tr><td>2013/0228105 A1 *</td><td>9/2013</td><td>Yamamura</td><td>F27D 17/002<br>110/345</td></tr>
<tr><td>2015/0253006 A1 *</td><td>9/2015</td><td>Grace</td><td>F24B 1/006<br>110/345</td></tr>
<tr><td>2018/0066560 A1 *</td><td>3/2018</td><td>Kawaguchi</td><td>F01N 5/02</td></tr>
</table>

FOREIGN PATENT DOCUMENTS

<table>
<tr><td>JP</td><td>4801789 B1</td><td>10/2011</td></tr>
<tr><td>JP</td><td>2011-220601 A</td><td>11/2011</td></tr>
<tr><td>JP</td><td>2011-231959 A</td><td>11/2011</td></tr>
<tr><td>JP</td><td>2012-247108 A</td><td>12/2012</td></tr>
</table>

* cited by examiner

METHOD AND APPARATUS FOR IMPROVING THERMAL EFFICIENCY OF HEATING DEVICE

TECHNICAL FIELD

The present invention relates to a method and apparatus for improving a thermal efficiency of a heating device that reduce an amount of heat flowing out from inside a heating furnace to the outside by installing an apparatus for improving thermal efficiency of a heating device in a pathway for heated gas of a heating device, for example, in an exhaust port of the heating furnace, or in a route for exhaust gas communicated with exhaust ports, and by the apparatus becoming heated by the passing heated gas (exhaust gas) and radiating, in the heating furnace, radiation heat from inside the heating furnace.

BACKGROUND ART

As heat loss in a gas-fired or atmosphere-controlling heating furnace, the most predominant factor is heat brought out by high-temperature exhaust gas that passes through exhaust ports provided in a heat chamber of the heating furnace and becomes radiated to the outside. Accordingly, a method and apparatus for improving thermal efficiency of a heating furnace by and with which the amount of heat flowing out from an exhaust port to the outside is reduced by installing heat-resistant cloth members inside an exhaust port of a heating furnace along the flow of passing exhaust gas to heat the cloth members and by radiating radiation heat inside the heating furnace by means of the heated cloth members are proposed (see e.g., Patent Literature 1).

CITATION LIST

Patent Literature

Patent Literature 1: Japanese Patent No. 4801789

SUMMARY OF INVENTION

Technical Problem

However, it is necessary to use supporting members in order to stably arrange cloth members in an exhaust port, and installation of the cloth members in the exhaust port becomes cumbersome and complicated. Also, due to the use of the supporting members, installation sites of the cloth members become limited. Additionally, if vibrations occur in the cloth members from the passing exhaust gas, the cloth members become damaged prematurely, which makes it difficult for the cloth members to be installed stably for a long period of time.

The present invention has been made in view of the above circumstances, and an object thereof is to provide a method and apparatus for improving thermal efficiency of a heating device by and with which an apparatus for improving thermal efficiency of a heating device can be installed easily at an arbitrary position in a pathway for heated gas from a heating device and stably for a long period of time, and an amount of heat flowing out from inside the heating device to the outside is reduced by the apparatus radiating (putting back), inside the heating device, radiation heat from inside the heating device after being heated with passing heated gas.

Solution to Problem

In order to achieve the above object, a method for improving thermal efficiency of a heating device according to a first aspect of the present invention includes: installing a heat-resistant inorganic conjugated molded product in and along a pathway for heated gas generated from a heating device without interrupting a flow of heated gas passing the pathway; heating the inorganic conjugated molded product with the heated gas; putting back into the heating device radiation heat from the heated inorganic conjugated molded product; and reducing an amount of heat that flows out from the heating device to the outside, the inorganic conjugated molded product being provided with an interior layer and an exterior layer, the exterior layer being formed of a coverture for inorganic materials that protects the interior layer from heated gas.

Here, the interior layer can be formed by a reinforcing material and a ceramic matrix, the reinforcing material being formed of a heat-resistant inorganic fiber, the ceramic matrix being filled in voids in the reinforcing material, and additionally, the reinforcing material can be formed having a cloth member or a processed fiber product.

In the case of the method for improving thermal efficiency of a heating device according to the first aspect of the present invention, the inorganic conjugated molded product can be 1) a flat plate body, 2) a disk body, 3) an embedded body formed by embedding a plurality of flat-plate-shaped objects in a lattice pattern in planar view, 4) a cylindrical body, 5) a hollow circular-truncated-cone body, 6) a hollow polygonal columnar body, or 7) a structural body having wing-shaped members.

Here, the structural body having wing-shaped members refers to, for example, an impeller (a windmill) of an air blower, moving vanes (a rotary impeller) or fixed vanes (including a casing to which the fixed vanes become attached) for use in an axial flow blower or an axial flow compressor.

In the case of the method for improving thermal efficiency of a heating device according to the first aspect of the present invention, the inorganic conjugated molded product can also be installed in the pathway through a supporting member.

In the case of the method for improving thermal efficiency of a heating device according to the first aspect of the present invention, it is preferable for the cloth member to be made from a woven fabric having a thickness of 0.2 mm or more and 10 mm or less and an aperture ratio of 30% or less, and the woven fabric may be any one of a plain weave, satin weave, twill weave, three-dimensional weave, and multi-axial weave.

In the case of the method for improving thermal efficiency of a heating device according to the first aspect of the present invention, the cloth member can also be made from a non-woven fabric having a thickness of 1 mm or more and 10 mm or less and a void fraction of 50% or more and 97% or less.

In the case of the method for improving thermal efficiency of a heating device according to the first aspect of the present invention, the cloth member can also be formed of a laminated product of cloth materials that is made by overlapping one or both of woven fabrics each having a thickness of 0.2 mm or more and 10 mm or less and an aperture ratio of 30% or less and non-woven fabrics each having a thickness of 1 mm or more and 10 mm or less and a void fraction of 50% or more and 97% or less.

In the case of the method for improving thermal efficiency of a heating device according to the first aspect of the present invention, the processed fiber product can be a laminated product in which long fibers consisting of the heat-resistant inorganic fiber are parallelly aligned in one direction, or cut fibers (short fibers) consisting of the heat-resistant inorganic fiber and having lengths of 1 to 70 mm.

In the case of the method for improving thermal efficiency of a heating device according to the first aspect of the present invention, it is preferable for the heat-resistant inorganic fiber to be a conjugated inorganic fiber provided with a multilayer structure having an inner shell structure and an outer shell structure, and provided that each element of the following is in a first group: Al; Ti, Cr; Fe; Si; Co; Ni, Cu; Y; Zr, Nb; Tc; Ru; Rh; Pd; Ag; La; Ce; Pr; Nd; Pm; Sm; Eu; Gd; Tb; Dy; Ho; Er; Tm; Yb; Lu; Hf; Ta; Re; and Os, it is preferable for the outer shell structure to be composed of a material A consisting of any one of (1) an oxide of one element selected from the first group, (2) a complex oxide consisting of two or more elements selected from the first group, (3) a solid solution oxide made of two or more elements selected from the first group, (4) the oxide and the complex oxide, (5) the oxide and the solid solution oxide, (6) the complex oxide and the solid solution oxide, and (7) the oxide, the complex oxide, and the solid solution oxide. It is preferable for a value of thermal expansion coefficient of an inorganic substance forming the outer shell structure to be within the range of ±10% of a value of thermal expansion coefficient of an inorganic substance forming the inner shell structure, and it is preferable for a thickness of the outer shell structure to be 0.2 µm or more and 10 µm or less.

In the case of the method for improving thermal efficiency of a heating device according to the first aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, it is preferable for the solid solution oxide composing the outer shell structure to be of one or more of the following general formulae: $Q_2Si_2O_7$, $QSiO_5$, $R_3Al_5O_{12}$; and $RAlO_3$.

In the case of the method for improving thermal efficiency of a heating device according to the first aspect of the present invention, provided that one metal composition to be selected from Ti, Zr, and Al is represented by Me, it is preferable for the inner shell structure to be composed of an inorganic substance containing Si, C, O, and Me.

In the case of the method for improving thermal efficiency of a heating device according to the first aspect of the present invention, provided that one metal composition to be selected from Ti, Zr, and Al is represented by Me, one metal composition to be selected from Ti and Zr, by Ms, and a carbide of the Ms, by MsC, the inner shell structure can be composed of an aggregate of crystalline ultrafine particles and an amorphous inorganic substance, the crystalline ultrafine particles containing 1) β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles.

In the case of the method for improving thermal efficiency of a heating device according to the first aspect of the present invention, the inner shell structure can also be composed of an amorphous inorganic substance containing Si, C, and O.

In the case of the method for improving thermal efficiency of a heating device according to the first aspect of the present invention, the inner shell structure may also be composed of an aggregate of crystalline ultrafine particles of β-SiC having a particle diameter of 700 nm or less and an amorphous inorganic substance containing Si, C, and O, the Si, C, and O existing between the crystalline ultrafine particles.

In the case of the method for improving thermal efficiency of a heating device according to the first aspect of the present invention, the inner shell structure can also be composed of a crystalline inorganic substance consisting of fine crystals of β-SiC.

In the case of the method for improving thermal efficiency of a heating device according to the first aspect of the present invention, it is preferable for an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 µm to exist between the inner shell structure and the outer shell structure of the conjugated inorganic fiber.

In the case of the method for improving thermal efficiency of a heating device according to the first aspect of the present invention, provided that one metal composition to be selected from Ti, Zr, and Al is represented by Me, it is preferable for the heat-resistant inorganic fiber to be composed of an inorganic substance containing Si, C, O, and Me.

In the case of the method for improving thermal efficiency of a heating device according to the first aspect of the present invention, the heat-resistant inorganic fiber can also be composed of an inorganic substance containing Si, C, and O.

In the case of the method for improving thermal efficiency of a heating device according to the first aspect of the present invention, the heat-resistant inorganic fiber may be composed of a crystalline inorganic substance consisting of fine crystals of β-SiC.

In the case of the method for improving thermal efficiency of a heating device according to the first aspect of the present invention, the heat-resistant inorganic fiber can also be composed of an inorganic substance containing Al, Si, and O.

In the case of the method for improving thermal efficiency of a heating device according to the first aspect of the present invention, it is preferable for the heat-resistant inorganic fiber to have a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 µm.

In the case of the method for improving thermal efficiency of a heating device according to the first aspect of the present invention, it is preferable for the ceramic matrix to be an inorganic product obtainable by pyrolyzing polymetallocarbosilane, and provided that one metal composition to be selected from Ti, Zr, and Al is represented by Md, it is preferable for the ceramic matrix to be composed of an inorganic substance containing Si, C, O, and Md.

In the case of the method for improving thermal efficiency of a heating device according to the first aspect of the present invention, the ceramic matrix is an inorganic product obtainable by pyrolyzing polymetallocarbosilane, and provided that one metal composition to be selected from Ti, Zr, and Al is represented by Md, one metal composition to be selected from Ti, and Zr is represented by Mp, and a carbide of the Mp is represented by MpC, the ceramic matrix can be composed of an aggregate of crystalline ultrafine particles and an amorphous inorganic substance, the crystalline ultrafine particles containing 1) β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles.

In the case of the method for improving thermal efficiency of a heating device according to the first aspect of the present invention, the ceramic matrix is an inorganic product obtainable by pyrolyzing polycarbosilane, and may be composed of an aggregate of crystalline ultrafine particles of β-SiC having a particle diameter of 700 nm or less and an amorphous inorganic substance containing Si, C, and O, the Si, C, and O existing between the crystalline ultrafine particles, or may be composed of an amorphous inorganic substance consisting of Si, C, and O.

In the case of the method for improving thermal efficiency of a heating device according to the first aspect of the present invention, the ceramic matrix is any one of a pyrolysate of polyaluminocarbosilane, a pyrolysate of polycarbosilane, a product of carbonization reaction between molten silicon and carbon, a product of carbonization reaction between molten silicon and a carbon compound, and a product of sintering reaction of a SiC fine powder containing a sintering additive, and can also be composed of a crystalline inorganic substance consisting of fine crystals of β-SiC.

In the case of the method for improving thermal efficiency of a heating device according to the first aspect of the present invention, the ceramic matrix may be either 1) an inorganic product obtainable by pyrolyzing a silazane-based polymer containing Si and N, and composed of any one of a Si—N-based amorphous inorganic substance, a Si—N—O-based amorphous inorganic substance, $Si_3N_4$ crystalline ultrafine particles, the Si—N-based amorphous inorganic substance and the $Si_3N_4$ crystalline ultrafine particles, and the Si—N—O-based amorphous inorganic substance and the $Si_3N_4$ crystalline ultrafine particles, or 2) composed of $Si_3N_4$ crystalline ultrafine particles that are products of sintering reaction of a $Si_3N_4$ fine powder containing a sintering additive.

In the case of the method for improving thermal efficiency of a heating device according to the first aspect of the present invention, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, it is preferable for the coverture for inorganic materials that forms the exterior layer to be composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and it is preferable for a thickness of the exterior layer to be 0.2 µm or more and 10 µm or less.

In the case of the method for improving thermal efficiency of a heating device according to the first aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, it is preferable for the solid solution oxide to be of one or more of the following general formulae: $Q_2Si_2O_7$, $QSiO_5$, $R_3Al_5O_{12}$, and $RAlO_3$.

An apparatus for improving thermal efficiency of a heating device according to a second aspect of the present invention is an apparatus for improving thermal efficiency of a heating device for use in the method for improving thermal efficiency of a heating device according to the first aspect of the present invention, and the interior layer of the inorganic conjugated molded product is formed by a reinforcing material and a ceramic matrix, the reinforcing material being formed of a heat-resistant inorganic fiber, the ceramic matrix being filled in voids in the reinforcing material, the reinforcing material further being formed having a cloth member or a processed fiber product.

In the case of the apparatus for improving thermal efficiency of a heating device according to the second aspect of the present invention, the inorganic conjugated molded product can be 1) a flat plate body, 2) a disk body, 3) an embedded body in which a plurality of flat-plate-shaped objects are embedded in a lattice pattern in planar view, 4) a cylindrical body, 5) a hollow circular-truncated-cone body, 6) a hollow polygonal columnar body, or 7) a structural body having wing-shaped members.

In the case of the apparatus for improving thermal efficiency of a heating device according to the second aspect of the present invention, the inorganic conjugated molded product can alternatively be installed in the pathway through a supporting member.

In the case of the apparatus for improving thermal efficiency of a heating device according to the second aspect of the present invention, the cloth member is made of a woven fabric having a thickness of 0.2 mm or more and 10 mm or less and an aperture ratio of 30% or less, and the woven fabric can be any one of a plain weave, satin weave, twill weave, three-dimensional weave, and multiaxial weave.

In the case of the apparatus for improving thermal efficiency of a heating device according to the second aspect of the present invention, the cloth member can also be made of a non-woven fabric having a thickness of 1 mm or more and 10 mm or less and a void fraction of 50% or more and 97% or less.

In the case of the apparatus for improving thermal efficiency of a heating device according to the second aspect of the present invention, the cloth member may also be formed of a laminated product of cloth materials that is made by overlapping either one or both of woven fabrics and non-woven fabrics, the woven fabrics each having a thickness of 0.2 mm or more and 10 mm or less and an aperture ratio of 30% or less, the non-woven fabrics each having a thickness of 1 mm or more and 10 mm or less and a void fraction of 50% or more and 97% or less.

In the case of the apparatus for improving thermal efficiency of a heating device according to the second aspect of the present invention, the processed fiber product can be either a laminated product in which long fibers consisting of the heat-resistant inorganic fiber are aligned parallel to one another in one direction, or short fibers consisting of the heat-resistant inorganic fiber and having lengths of 1 to 70 mm.

In the case of the apparatus for improving thermal efficiency of a heating device according to the second aspect of the present invention, it is preferable for the heat-resistant inorganic fiber to be a conjugated inorganic fiber provided with a multilayer structure having an inner shell structure and an outer shell structure, and provided that each element of the following is in a first group: Al; Ti, Cr; Fe; Si; Co; Ni; Cu; Y; Zr, Nb; Tc; Ru; Rh; Pd; Ag; La; Ce; Pr; Nd; Pm; Sm; Eu; Gd; Tb; Dy; Ho; Er; Tm; Yb; Lu; Hf; Ta; Re; and Os, it is preferable for the outer shell structure to be composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide. It is preferable for a value of thermal expansion coefficient of an inorganic substance forming the outer shell structure to be within the range of ±10% of a value of thermal expansion coefficient of an inorganic substance forming the inner shell structure, and it is preferable for a thickness of the outer shell structure to be 0.2 µm or more and 10 µm or less.

In the case of the apparatus for improving thermal efficiency of a heating device according to the second aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, it is preferable for the solid solution oxide to be of one or more of the following general formulae: $Q_2Si_2O_7$, $QSiO_5$, $R_3Al_5O_{12}$, and $RAlO_3$.

In the case of the apparatus for improving thermal efficiency of a heating device according to the second aspect of the present invention, provided that one metal composition to be selected from Ti, Zr, and Al is represented by Me, it is preferable for the inner shell structure to be composed of an inorganic substance containing Si, C, O, and Me.

In the case of the apparatus for improving thermal efficiency of a heating device according to the second aspect of the present invention, provided that one metal composition to be selected from Ti, Zr, and Al is represented by Me, one metal composition to be selected from Ti and Zr, by Ms, and a carbide of the Ms, by MsC, the inner shell structure can be composed of an aggregate of crystalline ultrafine particles and an amorphous inorganic substance, the crystalline ultrafine particles containing 1) β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles.

In the case of the apparatus for improving thermal efficiency of a heating device according to the second aspect of the present invention, the inner shell structure can also be composed of an amorphous inorganic substance containing Si, C, and O.

In the case of the apparatus for improving thermal efficiency of a heating device according to the second aspect of the present invention, the inner shell structure may also be composed of an aggregate of crystalline ultrafine particles of β-SiC having a particle diameter of 700 nm or less and an amorphous inorganic substance containing Si, C, and O, the Si, C, and O existing between the crystalline ultrafine particles.

In the case of the apparatus for improving thermal efficiency of a heating device according to the second aspect of the present invention, the inner shell structure can also be composed of a crystalline inorganic substance consisting of fine crystals of β-SiC.

In the case of the apparatus for improving thermal efficiency of a heating device according to the second aspect of the present invention, it is preferable for an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 µm to exist between the inner shell structure and the outer shell structure of the conjugated inorganic fiber.

In the case of the apparatus for improving thermal efficiency of a heating device according to the second aspect of the present invention, provided that one metal composition to be selected from Ti, Zr, and Al is represented by Me, it is preferable for the heat-resistant inorganic fiber to be composed of an inorganic substance containing Si, C, O, and Me.

In the case of the apparatus for improving thermal efficiency of a heating device according to the second aspect of the present invention, the heat-resistant inorganic fiber can be composed of an inorganic substance containing Si, C, and O.

In the case of the apparatus for improving thermal efficiency of a heating device according to the second aspect of the present invention, the heat-resistant inorganic fiber may alternatively be composed of a crystalline inorganic substance consisting of fine crystals of β-SiC.

In the case of the apparatus for improving thermal efficiency of a heating device according to the second aspect of the present invention, the heat-resistant inorganic fiber can also be composed of an inorganic substance containing Al, Si, and O.

In the case of the apparatus for improving thermal efficiency of a heating device according to the second aspect of the present invention, it is preferable for the heat-resistant inorganic fiber to have a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 µm.

In the case of the apparatus for improving thermal efficiency of a heating device according to the second aspect of the present invention, it is preferable for the ceramic matrix to be an inorganic product obtainable by pyrolyzing polymetallocarbosilane, and provided that one metal composition to be selected from Ti, Zr, and Al is represented by Md, it is preferable for the ceramic matrix to be composed of an inorganic substance containing Si, C, O, and Md.

In the case of the apparatus for improving thermal efficiency of a heating device according to the second aspect of the present invention, the ceramic matrix is an inorganic product obtainable by pyrolyzing polymetallocarbosilane, and provided that one metal composition to be selected from Ti, Zr, and Al is represented by Md, one metal composition to be selected from Ti and Zr, by Mp, and a carbide of the Mp, by MpC, the ceramic matrix can be composed of an aggregate of crystalline ultrafine particles and an amorphous inorganic substance, the crystalline ultrafine particles containing 1) β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles.

In the case of the apparatus for improving thermal efficiency of a heating device according to the second aspect of the present invention, the ceramic matrix is an inorganic product obtainable by pyrolyzing polycarbosilane, and may be composed of an aggregate of crystalline ultrafine particles of β-SiC having a particle diameter of 700 nm or less and an amorphous inorganic substance containing Si, C, and O, the Si, C, and O existing between the crystalline ultrafine particles, or may be composed of an amorphous inorganic substance consisting of Si, C, and O.

In the case of the apparatus for improving thermal efficiency of a heating device according to the second aspect of the present invention, the ceramic matrix is any one of a pyrolysate of polyaluminocarbosilane, a pyrolysate of polycarbosilane, a product of carbonization reaction between molten silicon and carbon, a product of carbonization reaction between molten silicon and a carbon compound, and a product of sintering reaction of a SiC fine powder containing a sintering additive, and can also be composed of a crystalline inorganic substance consisting of fine crystals of β-SiC.

In the case of the apparatus for improving thermal efficiency of a heating device according to the second aspect of the present invention, the ceramic matrix may be either 1) an inorganic product obtainable by pyrolyzing a silazane-based polymer containing Si and N, and composed of any one of a Si—N-based amorphous inorganic substance, a Si—N—O-based amorphous inorganic substance, $Si_3N_4$ crystalline ultrafine particles, the Si—N-based amorphous inorganic substance and the $Si_3N_4$ crystalline ultrafine particles, and the Si—N—O-based amorphous inorganic substance and the $Si_3N_4$ crystalline ultrafine particles, or 2) composed of $Si_3N_4$ crystalline ultrafine particles which are products of sintering reaction of a $Si_3N_4$ fine powder containing a sintering additive.

In the case of the apparatus for improving thermal efficiency of a heating device according to the second aspect of the present invention, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, it is preferable for the coverture for inorganic materials that forms the exterior layer to be composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and it is preferable for a thickness of the exterior layer to be 0.2 μm or more and 10 μm or less.

In the case of the apparatus for improving thermal efficiency of a heating device according to the second aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, it is preferable for the solid solution oxide to be of one or more of the following general formulae: $Q_2Si_2O_7$, $QSiO_5$, $R_3Al_5O_{12}$, and $RAlO_3$.

Advantageous Effects of Invention

In the case of the method for improving thermal efficiency of a heating device according to the first aspect of the present invention and the apparatus for improving thermal efficiency of a heating device according to the second aspect of the present invention, since an inorganic conjugated molded product is installed in the pathway for heated gas generated from the heating device, heat that flows out from the heating device to the outside through heated gas can be reduced efficiently, enabling a reduction in energy consumed by the heating device. Also, since heat that flows out from the heating device decreases, temperature distribution inside the heating device can be equalized. Additionally, since the installation of the inorganic conjugated molded product does not interrupt the flow of heated gas, causing no change in the flow of the heated gas inside the heating device and causing no risk of pressure increase inside the heating device, the inorganic conjugated molded product can easily be applied to a pathway for heated gas inside an existing heating device.

In the case of the method for improving thermal efficiency of a heating device according to the first aspect of the present invention and the apparatus for improving thermal efficiency of a heating device according to the second aspect of the present invention, since the inorganic conjugated molded product is provided with the interior layer and the exterior layer consisting of the coverture for inorganic materials that protects the interior layer from heated gas, deterioration of the interior layer can be prevented, increasing the number of heating devices in which the inorganic conjugated molded product can be installed.

In the case of the method for improving thermal efficiency of a heating device according to the first aspect of the present invention and the apparatus for improving thermal efficiency of a heating device according to the second aspect of the present invention, when the interior layer is formed by a reinforcing material and a ceramic matrix, the reinforcing material formed of a heat-resistant inorganic fiber, the ceramic matrix filled in the voids in the reinforcing material, strength enhancement, toughness improvement, enhancement in resistance to thermal shock, and weight saving of the inorganic conjugated molded product can be achieved, enabling a temperature of the inorganic conjugated molded product to easily conform with fluctuations in temperature of heated gas. Also, when the interior layer is formed by a reinforcing material and a ceramic matrix, the reinforcing material formed of a heat-resistant inorganic fiber, the ceramic matrix filled in the voids in the reinforcing material, by adjusting the form of the reinforcing material, an inorganic conjugated molded product having an intended form and size can be made easily.

In the case of the method for improving thermal efficiency of a heating device according to the first aspect of the present invention and the apparatus for improving thermal efficiency of a heating device according to the second aspect of the present invention, when the inorganic conjugated molded product is 1) a flat plate body, 2) a disk body, 3) an embedded body in which a plurality of flat-plate-shaped objects are embedded in a lattice pattern in planar view, 4) a cylindrical body, 5) a hollow circular-truncated-cone body, 6) a hollow polygonal columnar body, or 7) a structural body having wing-shaped members, by selecting an optimal form in accordance with the shape of the pathway for heated gas, the inorganic conjugated molded product can be heated efficiently by means of heated gas passing the pathway for heated gas.

In the case of the method for improving thermal efficiency of a heating device according to the first aspect of the present invention and the apparatus for improving thermal efficiency of a heating device according to the second aspect of the present invention, when the inorganic conjugated molded product is installed in the pathway through a supporting member, the inorganic conjugated molded product can be installed stably at an arbitrary position in the pathway.

In the case of the method for improving thermal efficiency of a heating device according to the first aspect of the present invention and the apparatus for improving thermal efficiency of a heating device according to the second aspect of the present invention, when the cloth member is made of a woven fabric having a thickness of 0.2 mm or more and 10 mm or less and an aperture ratio of 30% or less, interior layers (reinforcing materials) having various thicknesses can be made easily. Here, when the woven fabric is any one of a plain weave, satin weave, twill weave, three-dimensional weave, and multiaxial weave, by selecting the kind of woven fabric, an optimal interior layer (reinforcing material) suited for an intended purpose can be made.

In the case of the method for improving thermal efficiency of a heating device according to the first aspect of the present invention and the apparatus for improving thermal efficiency of a heating device according to the second aspect of the present invention, when the cloth member is made of a non-woven fabric having a thickness of 1 mm or more and 10 mm or less and a void fraction of 50% or more and 97% or less, interior layers (reinforcing materials) having various thicknesses can be made easily.

In the case of the method for improving thermal efficiency of a heating device according to the first aspect of the present invention and the apparatus for improving thermal efficiency of a heating device according to the second aspect of the present invention, when the cloth member is formed from a laminated product of cloth materials that is made by overlapping one or both of woven fabrics each having a thickness of 0.2 mm or more and 10 mm or less and an aperture ratio of 30% or less and non-woven fabrics each having a thickness of 1 mm or more and 10 mm or less and a void fraction of 50% or more and 97% or less, by changing the numbers of the woven fabrics and the non-woven fabrics, interior layers (reinforcing materials) of various thicknesses can be made easily.

In the case of the method for improving thermal efficiency of a heating device according to the first aspect of the present invention and the apparatus for improving thermal efficiency of a heating device according to the second aspect of the present invention, when the processed fiber product is a laminated product in which long fibers consisting of the heat-resistant inorganic fiber are aligned parallel to one another in one direction, an interior layer (reinforcing material) having high strength can be made. Also, when the processed fiber product is made of short fibers consisting of a heat-resistant inorganic fiber and having lengths of 1 to 70 mm, an interior layer (reinforcing material) having a complex form can be made easily.

In the case of the method for improving thermal efficiency of a heating device according to the first aspect of the present invention and the apparatus for improving thermal efficiency of a heating device according to the second aspect of the present invention, when the heat-resistant inorganic fiber is a conjugated inorganic fiber provided with a multilayer structure having an inner shell structure and an outer shell structure, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the outer shell structure is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, a value of thermal expansion coefficient of an inorganic substance forming the outer shell structure is within the range of ±10% of a value of thermal expansion coefficient of an inorganic substance forming the inner shell structure, and the thickness of the outer shell structure is 0.2 µm or more and 10 µm or less, even if temperature fluctuations occur in the interior layer (reinforcing material), peeling of the outer shell structure from the inner shell structure can be prevented.

In the case of the method for improving thermal efficiency of a heating device according to the first aspect of the present invention and the apparatus for improving thermal efficiency of a heating device according to the second aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, when the solid solution oxide composing the outer shell structure is of one or more of the following general formulae: $Q_2Si_2O_7$, $QSiO_5$; $R_3Al_5O_{12}$, and $RAlO_3$, heat resistance and corrosion resistance of the solid solution oxide (outer shell structure) can be enhanced.

In the case of the method for improving thermal efficiency of a heating device according to the first aspect of the present invention and the apparatus for improving thermal efficiency of a heating device according to the second aspect of the present invention, when the inner shell structure is (1) composed of an inorganic substance containing Si, C, O, and Me, provided that the Me represents one metal composition to be selected from Ti, Zr, and Al, (2) provided that Me represents one metal composition to be selected from Ti, Zr, and Al, Ms represents one metal composition to be selected from Ti and Zr, and MsC represents a carbide of the Ms, composed of an aggregate of crystalline ultrafine particles and an amorphous inorganic substance, the crystalline ultrafine particles containing 1) β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles, (3) composed of an amorphous inorganic substance containing Si, C, and O, (4) composed of an aggregate of crystalline ultrafine particles of β-SiC having a particle diameter of 700 nm or less and an amorphous inorganic substance containing Si, C, and O, the Si, C, and O existing between the crystalline ultrafine particles, or (5) composed of a crystalline inorganic substance consisting of fine crystals of β-SiC, specific heat in the cloth member is small, and radiant efficiency of radiation heat can be enhanced upon reaching a high temperature.

In the case of the method for improving thermal efficiency of a heating device according to the first aspect of the present invention and the apparatus for improving thermal efficiency of a heating device according to the second aspect of the present invention, when an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 µm exists between the inner shell structure and the outer shell structure of the conjugated inorganic fiber, since the intervening layer works as a sliding layer between the outer shell structure and the inner shell structure, brittle fracture of the inner shell structure can be prevented, and toughness of the conjugated inorganic fiber can be enhanced.

In the case of the method for improving thermal efficiency of a heating device according to the first aspect of the present invention and the apparatus for improving thermal efficiency of a heating device according to the second aspect of the present invention, when the heat-resistant inorganic fiber is (1) composed of an inorganic substance containing Si, C, O, and Me, provided that the Me represents one metal composition to be selected from Ti, Zr, and Al, (2) composed of an inorganic substance containing Si, C, and O, or (3) composed of a crystalline inorganic substance consisting of fine crystals of β-SiC, specific heat in the cloth member (reinforcing material) is small, and radiant efficiency of radiation heat can be enhanced upon being heated.

Also, when the heat-resistant inorganic fiber is composed of an inorganic substance containing Al, Si, and O, although the radiant efficiency of radiation heat becomes inferior, deterioration of the cloth member (reinforcing material) can be prevented even when used in an oxidizing atmosphere.

In the case of the method for improving thermal efficiency of a heating device according to the first aspect of the present invention and the apparatus for improving thermal efficiency of a heating device according to the second aspect of the present invention, when the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm, since the covering layer works as a sliding layer between the heat-resistant inorganic fiber and the ceramic matrix, brittle fracture of the heat-resistant inorganic fiber can be prevented, and toughness of the inorganic conjugated molded product can be enhanced.

In the case of the method for improving thermal efficiency of a heating device according to the first aspect of the present invention and the apparatus for improving thermal efficiency of a heating device according to the second aspect of the present invention, when the ceramic matrix is (1) an inorganic product obtainable by pyrolyzing polymetallocarbosilane, and composed of an inorganic substance containing Si, C, O, and Md, provided that the Md represents one metal composition to be selected from Ti, Zr, and Al, (2) an inorganic product obtainable by pyrolyzing polymetallocarbosilane, and composed of an aggregate of crystalline ultrafine particles and an amorphous inorganic substance, the crystalline ultrafine particles containing 1)β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles, provided that the Md represents one metal composition to be selected from Ti, Zr, and Al, the Mp represents one metal composition to be selected from Ti and Zr, and the MpC represents a carbide of the Mp, (3) an inorganic product obtainable by pyrolyzing polycarbosilane and composed of an aggregate of crystalline ultrafine particles of β-SiC having a particle diameter of 700 nm or less and an amorphous inorganic substance containing Si, C, and O, the Si, C, and O existing between the crystalline ultrafine particles, or composed of an amorphous inorganic substance consisting of Si, C, and O, or (4) any one of a pyrolysate of polyaluminocarbosilane, a pyrolysate of polycarbosilane, a product of carbonization reaction between molten silicon and carbon, a product of carbonization reaction between molten silicon and a carbon compound, and a product of sintering reaction of a SiC fine powder containing a sintering additive, and composed of a crystalline inorganic substance consisting of fine crystals of β-SiC, enhancement in heat-resistance, improvement in high-temperature creep resistance properties, and enhancement in high temperature corrosion resistance can be achieved, and at the same time, radiant efficiency of radiation heat can be enhanced upon reaching a high temperature.

In the case of the method for improving thermal efficiency of a heating device according to the first aspect of the present invention and the apparatus for improving thermal efficiency of a heating device according to the second aspect of the present invention, when the ceramic matrix is 1) an inorganic product obtainable by pyrolyzing a silazane-based polymer containing Si and N, and composed of any one of a Si—N-based amorphous inorganic substance, a Si—N—O-based amorphous inorganic substance, $Si_3N_4$ crystalline ultrafine particles, the Si—N-based amorphous inorganic substance and the $Si_3N_4$ crystalline ultrafine particles, and the Si—N—O-based amorphous inorganic substance and the $Si_3N_4$ crystalline ultrafine particles, or 2) composed of $Si_3N_4$ crystalline ultrafine particles which are products of sintering reaction of a $Si_3N_4$ fine powder containing a sintering additive, hardness and abrasion resistance of the ceramic matrix can be enhanced.

In the case of the method for improving thermal efficiency of a heating device according to the first aspect of the present invention and the apparatus for improving thermal efficiency of a heating device according to the second aspect of the present invention, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, when the coverture for inorganic materials that forms the exterior layer is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and when the thickness of the exterior layer is 0.2 μm or more and 10 μm or less, even if temperature fluctuations occur in the interior layer (reinforcing material), peeling of the exterior layer from the interior layer can be prevented.

In the case of the method for improving thermal efficiency of a heating device according to the first aspect of the present invention and the apparatus for improving thermal efficiency of a heating device according to the second aspect of the present invention, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, when the solid solution oxide is of one or more of the following general formulae: $Q_2Si_2O_7$, $QSiO_5$; $R_3Al_5O_{12}$, and $RAlO_3$, heat resistance and corrosion resistance of the solid solution oxide (coverture for inorganic materials) can be enhanced.

DESCRIPTION OF EMBODIMENTS

Next, with reference to the accompanying drawings, descriptions will be given on embodiments of the present invention for a better understanding of the present invention.

Figure 1A:
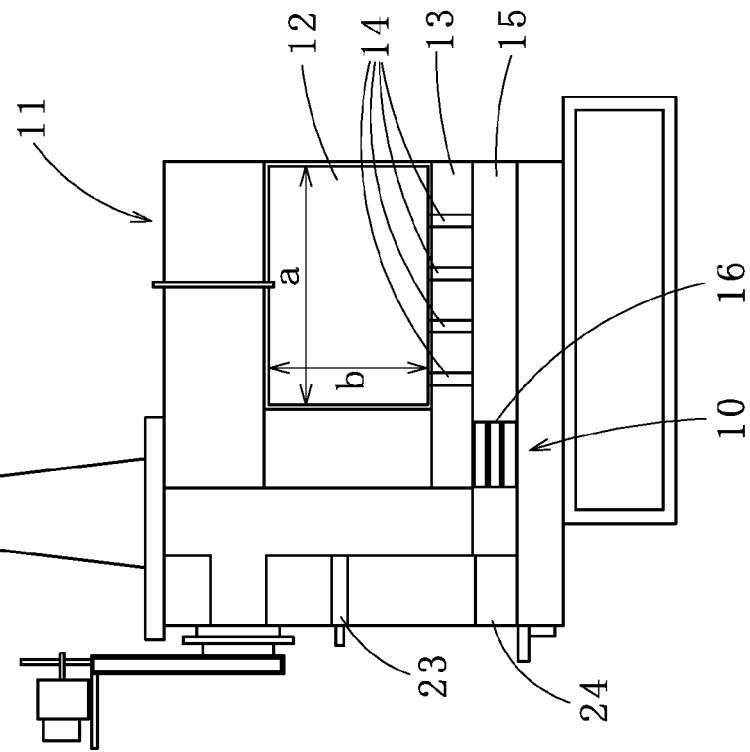
FIGS. 1(A) and 1(B) are a rear view and a side sectional elevation, respectively, of an apparatus for improving thermal efficiency of a heating device according to one embodiment of the present invention.
Figure 1B:
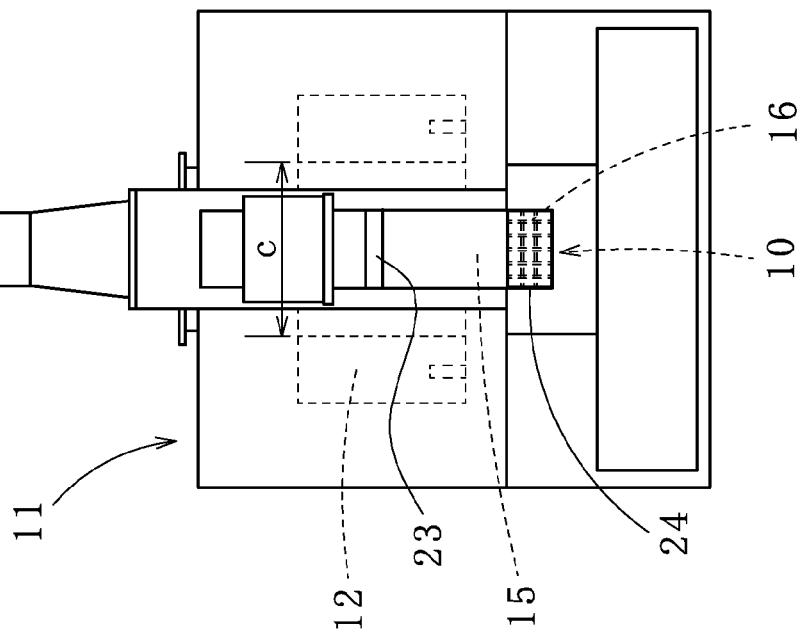

As illustrated in FIGS. 1(A) and 1(B), an apparatus for improving thermal efficiency of a heating device (hereinafter simply referred to as the apparatus for improving thermal efficiency) 10 according to one embodiment of the present invention includes a heat-resistant inorganic conjugated molded product 16 to be arranged (directly inserted in a route for exhaust gas 15 without using a supporting member) in the route for exhaust gas 15 (an example of pathways for heated gas) communicated with each of exhaust ports 14 provided in plurality at, for example, a hearth part 13 of a heating chamber 12 in a heating furnace 11 which is an example of heating devices, and along the flow of exhaust gas (an example of heated gas) passing through the route for exhaust gas 15 in a manner that does not interrupt the flow of the exhaust gas, and to be heated by exhaust gas. Radiation heat radiated from the heated inorganic conjugated molded product 16 is thereby put back into the heating chamber 12 through the route for exhaust gas 15 and the exhaust ports 14, consequently decreasing heat that becomes flown out from the heating chamber 12 to the outside. Detailed descriptions will be given below.

Figure 2:
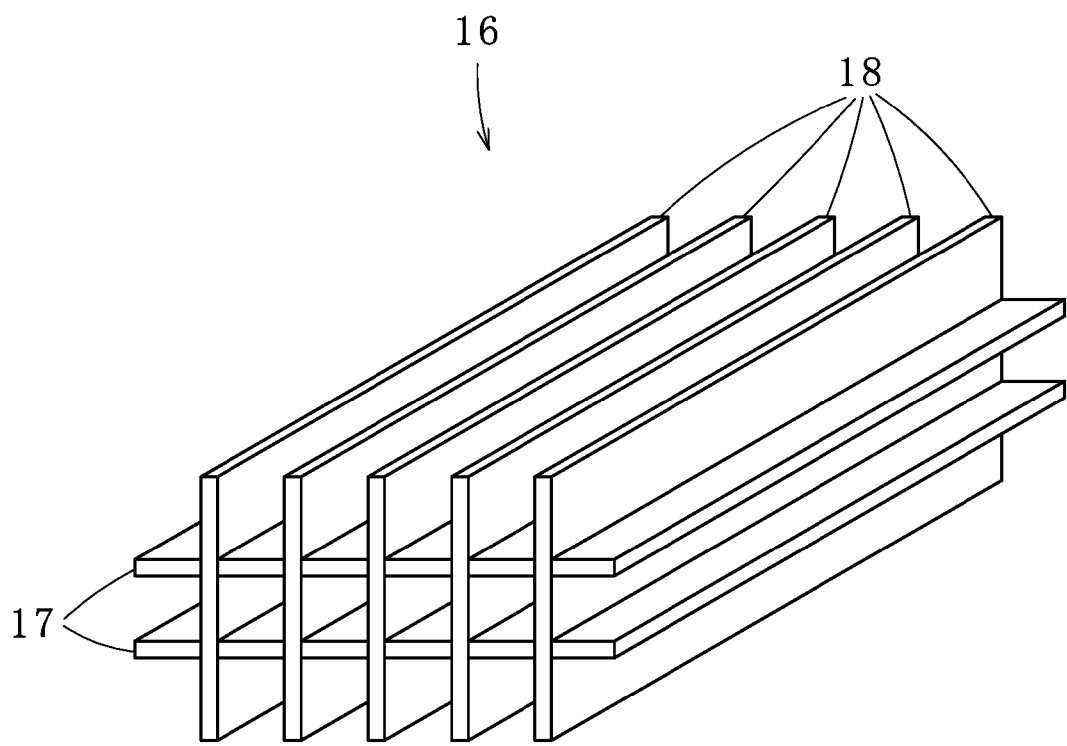
FIG. 2 is a perspective view of an inorganic conjugated molded product of the same apparatus for improving thermal efficiency.

The inorganic conjugated molded product 16 is, as illustrated in FIGS. 1(A), 1(B), and 2, an embedded body (an aggregate) in which a plurality of flat-plate-shaped objects 17 and 18 are embedded in a lattice pattern in planar view. By installing the inorganic conjugated molded product 16 in the route for exhaust gas 15, exhaust gas flows along the flat-plate-shaped objects 17 and 18 and the sides of the route for exhaust gas 15. When the exhaust gas passes along the flat-plate-shaped objects 17 and 18, heat exchange is performed between the flat-plate-shaped objects 17 and the flat-plate-shaped objects 18, and the flat-plate-shaped objects 17 and 18 (the inorganic conjugated molded product 16) become heated.

The inorganic conjugated molded product 16 can alternatively be fixed in the route for exhaust gas 15 through a supporting member instead of installing it directly in the route for exhaust gas 15. Here, the supporting member is made using a heat-resistant iron-chromium wire and wire gauzes of the heat-resistant iron-chromium wire, a high-heat-resistant oxide (e.g., alumina), or a high-heat-resistant non-oxide (e.g., silicon carbide, silicon nitride, and sialon). Deformation of and damages to the supporting member under high temperature can thereby be prevented, enabling a stable usage of the supporting member for a long period of time.

The form of an inorganic conjugated molded product needs to be determined in accordance with the cross-sectional shape and length of a pathway in which the inorganic conjugated molded product becomes installed, and other than an embedded body, an inorganic conjugated molded product can be formed in the shape of, for example, a flat plate body, a disk body, a cylindrical body, a hollow circular-truncated-cone body having an aperture formed on both ends, a hollow polygonal columnar body having an aperture formed on both ends, or a structural body having wing-shaped members. Here, the structural body having wing-shaped members refers to, for example, an inorganic conjugated molded product covering (shielding from heat) vanes of a fan installed in a pathway through which heated gas passes or an inorganic conjugated molded product forming vanes themselves, or an inorganic conjugated molded product forming a casing holding together a plurality of vane members that control the flow direction of heated gas passing the pathway.

Figure 3:
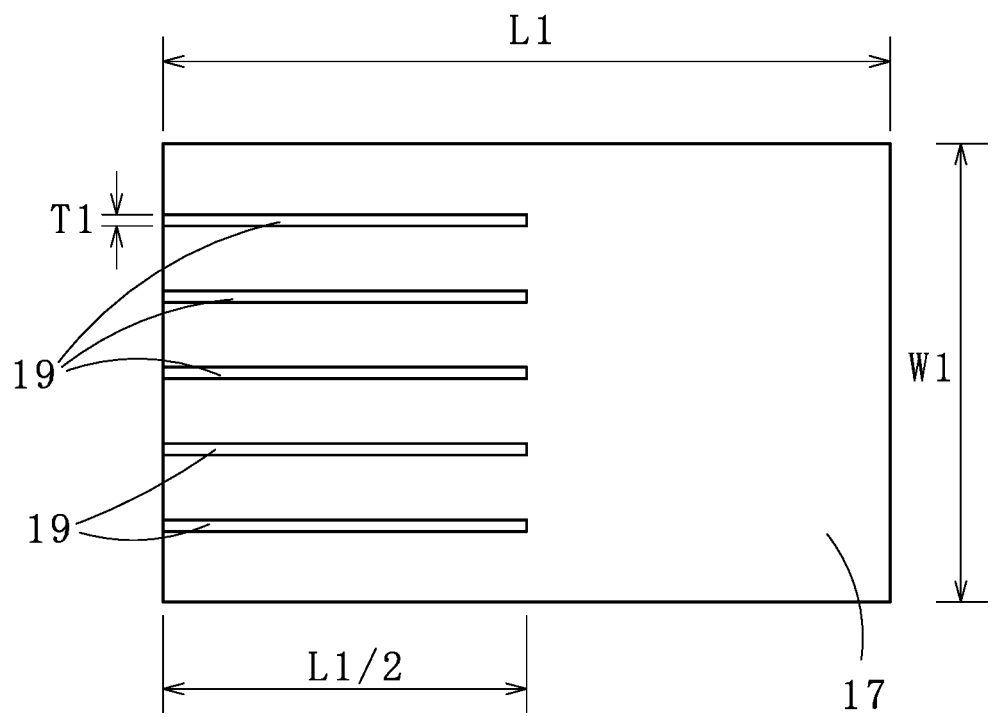
FIG. 3 is an explanatory diagram illustrating a producing method for producing an inorganic conjugated molded product.
Figure 3:
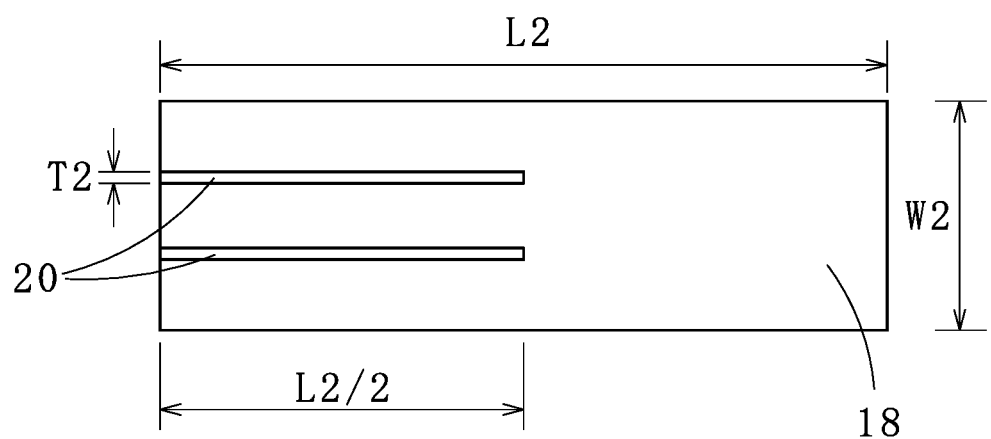

As illustrated in FIG. 3, for example, in each of the flat-plate-shaped objects 17, at positions dividing a length W1 in the width direction of each of the flat-plate-shaped objects 17 into six equal parts, cuts 19 (of which each width T1 is larger than the thickness of each of the flat-plate-shaped objects 18 by 0.5 to 1 mm) each having a length half a length L1 of each of the flat-plate-shaped objects 17 are formed along the longitudinal direction. In each of the flat-plate-shaped objects 18, at positions dividing a length W2 in the width direction of each of the flat-plate-shaped objects 18 into three equal parts, cuts 20 (of which each width T2 is larger than the thickness of each of the flat-plate-shaped objects 17 by 0.5 to 1 mm) each having a length half a length L2 of each of the flat-plate-shaped objects 18 are formed along the longitudinal direction. By fitting together the cuts 19 in the flat-plate-shaped objects 17 and the cuts 20 in the flat-plate-shaped objects 18 through insertion with respect to one another along the cuts 19 and 20, the inorganic conjugated molded product 16 illustrated in FIG. 2 becomes formed.

Here, each of the flat-plate-shaped objects 17 and 18 (i.e., the inorganic conjugated molded product 16) is provided with an interior layer and an exterior layer that consists of a coverture for inorganic materials protecting the interior layer from heated gas. The interior layer is formed of a reinforcing material and a ceramic matrix, the reinforcing material made of a cloth member formed of a heat-resistant inorganic fiber, the ceramic matrix filled in voids in the reinforcing material. Instead of using, as the reinforcing material, the cloth member formed of the heat-resistant inorganic fiber, a reinforcing material formed using a processed fiber product in which a heat-resistant inorganic fiber is used (e.g., a laminated product in which long fibers consisting of a heat-resistant inorganic fiber are parallelly aligned in one direction, and an intricate body or oriented body of short fibers consisting of a heat-resistant inorganic fiber and having lengths of 1 to 70 mm) can alternatively be used.

The cloth member is made by cutting a cloth material formed from a woven fabric having a thickness of 0.2 to 10 mm and an aperture ratio of 30% or less or a non-woven fabric having a thickness of 1 to 10 mm and a void fraction of 50 to 97%. Here, the woven fabric is any one of a plain weave, satin weave, twill weave, three-dimensional weave, and multiaxial weave. Due to this, by selecting the kind of woven fabric, an optimal cloth member suited for each intended purpose can be obtained. A cloth member can also be formed from a laminated product of cloth materials in which one or both of woven fabrics each having a thickness of 0.2 mm or more and 10 mm or less and an aperture ratio of 30% or less and non-woven fabrics each having a thickness of 1 mm or more and 10 mm or less and a void fraction of 50% or more and 97% or less are laminated.

The cloth member is made by cutting a cloth material composed of a conjugated inorganic fiber (an example of heat-resistant inorganic fibers) consisting of a multilayer structure having an inner shell structure and an outer shell structure. Here, the inner shell structure is composed of any one of (1) an inorganic substance containing Si, C, O, and Me, provided that the Me represents one metal composition to be selected from Ti, Zr, and Al, (2) provided that Me represents one metal composition to be selected from Ti, Zr, and Al, Ms represents one metal composition to be selected from Ti and Zr, and MsC represents a carbide of the Ms, an aggregate of crystalline ultrafine particles and an amorphous inorganic substance, the crystalline ultrafine particles containing 1)β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles, (3) an amorphous inorganic substance containing Si, C, and O, (4) an aggregate of crystalline ultrafine particles of β-SiC and an amorphous inorganic substance, the crystalline ultrafine particles of β-SiC having a particle diameter of 700 nm or less, the amorphous inorganic substance containing Si, C, and O, the Si, C, and O existing between the crystalline ultrafine particles, and (5) a crystalline inorganic substance consisting of fine crystals of β-SiC.

On the other hand, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the outer shell structure is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide. A value of thermal expansion coefficient of an inorganic substance forming the outer shell structure is within the range of ±10% of a value of thermal expansion coefficient of an inorganic substance forming the inner shell structure, and the thickness of the outer shell structure is 0.2 μm or more and 10 μm or less. Peeling of the outer shell structure from the inner shell structure can thereby be prevented upon occurrence of temperature fluctuations in the conjugated inorganic fiber.

Provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide is of one or more of the following general formulae: $Q_2Si_2O_7$, $QSiO_5$, $R_3Al_5O_{12}$, and $RAlO_3$. Heat resistance and corrosion resistance of the solid solution oxide (i.e., the outer shell structure) thereby becomes enhanced. Here, an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 μm is made to exist between the inner shell structure and the outer shell structure. Brittle fracture of the inner shell structure can thereby be prevented.

In the voids in the cloth member, by, for example, forming a ceramic matrix by means of a method described below, an interior layer becomes formed.

After soaking (impregnating) the cloth member, under room temperature, in a solution in which an organosilicon compound has dissolved, the cloth member is removed from the solution, and dried in, for example, a non-oxidizing atmosphere (e.g., a nitrogen gas atmosphere) of which temperature is 90 to 200° C. for 1 to 5 hours. The organosilicon compound can thereby be made to exist in the voids in the conjugated inorganic fiber forming the cloth member. Subsequently, the as-dried cloth member is heat-treated in a non-oxidizing atmosphere (e.g., a nitrogen gas atmosphere) at 1000 to 1900° C. for 2 to 10 hours. A ceramic matrix obtainable from an organosilicon compound and consisting of an inorganic product can thereby be filled in the voids in the conjugated inorganic fiber. Performing further repetitions of the organosilicon compound impregnation and heat treatment on the cloth member having the voids in the conjugated inorganic fiber filled with the ceramic matrix can enhance filling rate of the ceramic matrix existing in the voids in the conjugated inorganic fiber.

when polymetallocarbosilane is used as the organosilicon compound, the ceramic matrix is composed of either (1) an inorganic substance containing Si, C, O, and Md, provided that the Md represents one metal composition to be selected from Ti, Zr, and Al, or (2) provided that Md represents one metal composition to be selected from Ti, Zr, and Al, Mp represents one metal composition to be selected from Ti and Zr, and MpC represents a carbide of the Mp, an aggregate of crystalline ultrafine particles and an amorphous inorganic substance, the crystalline ultrafine particles containing 1)β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles.

When polycarbosilane is used as the organosilicon compound, the ceramic matrix is composed of any one of (3) an aggregate of crystalline ultrafine particles of β-SiC having a particle diameter of 700 nm or less and an amorphous inorganic substance containing Si, C, and O, the Si, C, and O existing between crystalline ultrafine particles, (4) an amorphous inorganic substance consisting of Si, C, and O, and (5) a crystalline inorganic substance consisting of fine crystals of β-SiC. When polyaluminocarbosilane is used as the organosilicon compound, the ceramic matrix is composed of (6) a crystalline inorganic substance consisting of fine crystals of β-SiC. Additionally, it is also possible for the ceramic matrix to be composed of any one of (7) a crystalline inorganic substance consisting of fine crystals of β-SiC which are products of carbonization reaction obtained by injecting molten silicon into voids in a conjugated inorganic fiber after making carbon exist in the voids, (8) a crystalline inorganic substance consisting of fine crystals of β-SiC which are products of carbonization reaction obtained by injecting molten silicon and a carbon compound (e.g., methane or ethane) into the voids in the conjugated inorganic fiber and making the molten silicon and the carbon compound react with each other, and (9) a crystalline inorganic substance consisting of fine crystals of β-SiC which are products of sintering reaction obtained by filling a SiC fine powder containing a sintering agent into the voids in the conjugated inorganic fiber and applying heat.

Here, as the organosilicon compound, a silazane-based polymer containing Si and N is also usable. When using the silazane-based polymer, the ceramic matrix is composed of any one of (10) a Si—N-based amorphous inorganic substance, (11) a Si—N—O-based amorphous inorganic substance, (12) $Si_3N_4$-based crystalline ultrafine particles, (13) the Si—N-based amorphous inorganic substance and the $Si_3N_4$ crystalline ultrafine particles, and (14) the Si—N—O-based amorphous inorganic substance and the $Si_3N_4$ crystalline ultrafine particles. Furthermore, the ceramic matrix can also be composed of (15) any one of $Si_3N_4$ crystalline ultrafine particles which are products of sintering reaction obtained by filling the voids in the conjugated inorganic fiber with a $Si_3N_4$ fine powder containing a sintering agent and applying heat.

Provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the coverture for inorganic materials that forms the exterior layer is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide. The thickness of the exterior layer is made to be 0.2 µm or more and 10 µm or less. Long-term durability of the inorganic conjugated molded product under high temperature and rough conditions can thereby be enhanced.

Provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide is of one or more of the following general formulae: $Q_2Si_2O_7$, $QSiO_5$, $R_3Al_5O_{12}$, and $RAlO_3$. Heat resistance and corrosion resistance of the solid solution oxide (the coverture for inorganic materials) can thereby be enhanced.

The exterior layer consisting of the coverture for inorganic materials protecting the interior layer from heated gas is formed by, for example, a method described below.

The interior layer (the cloth member in a condition of having the voids filled with the ceramic matrix) is soaked in a solution in which a material A is dispersed to make a powder of the material A adhere to the surface of the interior layer by means of electrophoresis. Next, after removing from the solution and drying the interior layer to which the powder of the material A is adhered, by heat-treating the interior layer in a non-oxidizing atmosphere, the powder of the material A is made to become sintered and firmly fixed to the interior layer. Consequently, a coverture for inorganic materials that consists of a sintered layer of the material A becomes formed on the outside of the interior layer as an exterior layer. Conditions for the heat treatment in a non-oxidizing atmosphere (e.g., the kind of non-oxidizing atmosphere, heat-treatment temperature, duration of the heat-treatment, ambient pressure at the time of the heat-treatment and the like) are determined based on the composition of the material A.

In place of the conjugated inorganic fiber forming the cloth member, it is possible to make a cloth member M from a cloth material M (in the case of a woven fabric, the thickness is 0.2 to 10 mm and the aperture ratio is 30% or less, and in the case of a non-woven fabric, the thickness is 1 to 10 mm and the void fraction is 50 to 97%) formed using (1) a heat-resistant inorganic fiber composed of an inorganic substance containing Si, C, O, and Me, provided that the Me represents one metal composition to be selected from Ti, Zr, and Al, (2) a heat-resistant inorganic fiber composed of an inorganic substance containing Si, C, and O, or (3) a heat-resistant inorganic fiber composed of a crystalline inorganic substance consisting of fine crystals of β-SiC. Here, provided that the one metal composition to be selected from Ti, Zr, and Al is represented by Md, the one metal composition to be selected from Ti and Zr is represented by Mp, and a carbide of the Mp is represented by MpC, the inorganic substance containing Si, C, O, and Me contains an aggregate of crystalline ultrafine particles and an amorphous inorganic substance, the crystalline ultrafine particles containing 1) β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles. Also, the inorganic substance containing Si, C, and O contains an aggregate of crystalline ultrafine particles of β-SiC having a particle diameter of 700 nm or less and an amorphous inorganic substance containing Si, C, and O, the Si, C, and O existing between the crystalline ultrafine particles.

A method for filling a ceramic matrix in voids in the cloth member M can be performed in the same manner as the case of using a cloth member composed of a conjugated inorganic fiber. When a chemical fiber (e.g., a rayon fiber) are contained in a cloth material M used for making the cloth member M or when a sizing agent is on the cloth material prior to the formation of ceramic matrix, the cloth member M made by cutting the cloth material M becomes heat-treated in an inert gas atmosphere (a nitrogen gas atmosphere, preferably, an argon gas atmosphere) at a temperature of 800 to 1200° C. for 0.5 to 5 hours and is made to be completely inorganic (the chemical fiber is decomposed and removed completely, or decomposed and removed partially, remnant is carbonized and the sizing agent is removed completely). Additionally, a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 µm becomes provided to the surface of the heat-resistant inorganic fiber composing the cloth member M having been made to be completely inorganic. Marked reactions between the heat-resistant inorganic fiber and the ceramic matrix can thereby be prevented upon existence of the ceramic matrix in the voids in the cloth member M, preventing the deterioration of strength in the heat-resistant inorganic fiber.

The cloth member M was made from the cloth material M formed using the heat-resistant inorganic fiber having neither an inner shell structure nor an outer shell structure, and the voids in the cloth member M were filled with the ceramic matrix. However, it is possible to make a sintered layer consisting of a material A firmly fixed to the surface of the heat-resistant inorganic fiber by making a powder of the material A adhere to the outside of the heat-resistant inorganic fiber forming the cloth member M by means of, for example, electrophoresis and performing heat treatment before filling the voids in the cloth member M with the ceramic matrix. The heat-resistant inorganic fiber forming the cloth member M can thereby be altered to the state of a conjugated inorganic fiber, and corrosion resistance of the heat-resistant inorganic fiber can be enhanced. It is preferable to make an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 µm exist on the surface of the heat-resistant inorganic fiber forming the cloth member M. Brittle fracture of the heat-resistant inorganic fiber can thereby be prevented.

Next, descriptions will be given on a method for improving thermal efficiency of a heating device in which the apparatus for improving thermal efficiency of a heating device 10 according to one embodiment of the present invention is used. By installing the inorganic conjugated molded product 16 of the apparatus for improving a thermal efficiency of a heating device 10 in the route for exhaust gas 15 of the heating furnace 11, exhaust gas flows through empty spaces among the flat-plate-shaped objects 17 and 18 composing the inorganic conjugated molded product 16 and empty spaces among the flat-plate-shaped objects 17, 18 and the sides of the route for exhaust gas 15 along the route for exhaust gas 15 and becomes discharged to the outside. The inorganic conjugated molded product 16 (the flat-plate-shaped objects 17 and 18) thereby becomes heated efficiently, and by radiation heat radiated from the heated inorganic conjugated molded product 16, an area upstream of the position of installation of the inorganic conjugated molded product 16 in the route for exhaust gas 15 becomes heated and the temperature rises. As a result, the amount of radiation heat radiated from the area on the upstream side in the route for exhaust gas 15 increases, and part of the radiation heat enters into a heating chamber 12, which enables a reduction in the amount of heat that flows out from the heating furnace 11 to the outside.

Since the exhaust gas flows through the spaces among the flat-plate-shaped objects 17 and 18 and the spaces among the flat-plate-shaped objects 17, 18 and the sides of the route for exhaust gas 15 along the route for exhaust gas 15, and the installation of the inorganic conjugated molded product 16 in the route for exhaust gas 15 does not interrupt the passing of exhaust gas, a flow of the in-furnace gas inside the heating chamber 12 can be kept the same as that in the case of not installing the inorganic conjugated molded product 16 in the route for exhaust gas 15, and at the same time, there is no risk of rise in furnace pressure, enabling easy application of the apparatus for improving thermal efficiency 10 to an existing heating furnace 11. Also, it is easy to attach and remove the inorganic conjugated molded product 16 to and from the route for exhaust gas 15, which enables easy maintenance of the apparatus for improving thermal efficiency 10.

Here, since the inorganic conjugated molded product 16 is provided with the interior layer and the exterior layer consisting of the coverture for inorganic materials which protects the interior layer, provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the coverture for inorganic materials forming the exterior layer is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and the thickness of the exterior layer is 0.2 µm or more and 10 µm or less, peeling of the exterior layer from the interior layer can be prevented upon occurrence of temperature fluctuations in the exterior layer. Consequently, even when a constituent which deteriorates the interior layer is contained in exhaust gas, property degradation (e.g., decrease in strength, degradation of thermal emissivity, etc.) associated with changes in quality of material of the interior layer can be controlled.

Here, provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, when the solid solution oxide is of one or more of the following general formulae: $Q_2Si_2O_7$; $QSiO_5$; $R_3Al_5O_{12}$; and $RAlO_3$, heat resistance and corrosion resistance of the solid solution oxide (i.e., the exterior layer) can be enhanced, which infallibly prevents the changes in the quality of material in the interior layer, enabling further enhancement of stability in the interior layer.

Since specific heat is small in the interior layer composing the inorganic conjugated molded product, the inorganic conjugated molded product can easily conform with the temperature fluctuation of heated gas regardless of the quality of material of the exterior layer, and at the same time, radiant efficiency of radiation heat can be enhanced upon reaching a high temperature. Also, since the inner shell structure and the outer shell structure of the conjugated inorganic fiber forming the reinforcing material for the interior layer each are formed by an inorganic substance of the above-described composition, peeling of the outer shell structure from the inner shell structure can be prevented even upon occurrence of temperature fluctuations in the outer shell structure, protecting the inner shell structure from heated gas and enhancing stability in the inner shell structure. In FIGS. 1(A) and 1(B), a numeral 23 indicates a manual damper, and a numeral 24 indicates an aperture that is normally blocked by heat-resistant bricks. Respective measurements, a, b, and c, of the heating chamber 12 are, for example, 700 mm, 400 mm, and 455 mm, respectively. However, the present invention is not limited to these measurements. The aperture 24 functions as a cold air hole when the heat-resistant bricks are removed.

EXPERIMENTAL EXAMPLE

Descriptions will be given hereunder on experimental examples performed to check the function effects of the method and apparatus for improving thermal efficiency according to the present invention.

Experimental Example 1

Two base materials each having a length L1 of 320 mm and a width W1 of 200 mm and five base materials each having a length L2 of 320 mm and a width W2 of 110 mm were made by cutting a non-woven fabric (having a fiber diameter of 11 µm, a weight of 240 g/m$^2$ and a void fraction of 95%, containing 20% by mass of rayon fiber which is an example of chemical fibers, and rolled in a roll-shape of 500 mm in width, 5 mm in thickness and 10 m in length) made using a heat-resistant inorganic fiber formed of an inorganic substance containing Si, C, O, and Zr. The base materials (pieces of the non-woven fabric) were set in a heat-treating furnace and heat-treated in an argon gas atmosphere at a temperature of 800° C. for an hour to partially decompose and remove the rayon fiber contained in each of the base materials, carbonize the remainder, and concurrently remove a sizing agent (an organic substance) on each of the base materials (a first step).

Next, the heat-treated base materials were made to hold one another by means of two stainless wire gauzes that were to become anode electrodes, and arranged between two C/C composite cathode electrodes arranged opposed to each other with a distance in between inside a bathtub in which a dispersion solution (in which 100 parts of ethanol, 2.5 parts of fine powder of $Y_2SiO_5$, 0.02 parts of cyclohexanol-based dispersant, and 0.02 parts of polyvinyl butyral as a binder were added and ultrasonic dispersion was performed for preparation) in which a powder (a particle diameter of 1 μm or less) of yttrium monosilicate ($Y_2SiO_5$) which is a solid solution oxide consisting of elements of Si and Y selected from the first group had been homogeneously dispersed in ethanol solvent was retained. Then, at a temperature of 25° C., direct current of 100 V was applied for 30 minutes from a direct-current stabilizing power supply, and the powder of yttrium monosilicate were made to adhere to the outside of the heat-resistant inorganic fiber composing the non-woven fabric forming the base materials through electrophoresis (a second step).

After removing the base materials from the dispersion solution, draining the dispersion solution from the base materials, air drying the base materials for 2 hours, and hot-air drying the base materials in the atmosphere at 40° C. for 6 hours (a third step), in an argon gas atmosphere under a slightly increased pressure of 0.5 MPa, by processing the base materials at 1400° C. for 3 hours, and making the powder of yttrium monosilicate having been made to adhere to the outside of the heat-resistant inorganic fiber sintered to make the powder firmly fixed to the heat-resistant inorganic fiber, the heat-resistant inorganic fiber was changed to a conjugated inorganic fiber having an inner shell structure (consisting of an inorganic substance containing Si, C, O, and Zr) and an outer shell structure (yttrium monosilicate of 2 μm in thickness), and seven cloth members (two having a length L1 of 320 mm, a width W1 of 200 mm and a thickness of 5 mm, and the other five having a length L2 of 320 mm, a width W2 of 110 mm and a thickness of 5 mm) each consisting of a non-woven fabric composed of the conjugated inorganic fiber were made (a fourth step).

After the cloth members were soaked, under room temperature, in a solution in which 30 wt % of poly-zirconocarbosilane is uniformly dissolved in a xylene solvent, and then the cloth members were removed from the solution, the cloth members were dried in a nitrogen gas atmosphere at 150° C. for 2 hours to remove the xylene solvent contained in the cloth members, and seven cloth members each containing (containing in voids in the cloth members) poly-zirconocarbosilane were made (a fifth step). Next, by burning the cloth members containing poly-zirconocarbosilane in an argon gas atmosphere at 1200° C. for an hour, ceramics consisting of Si, C, O, and Zr, which are inorganic products obtainable by pyrolyzing the poly-zirconocarbosilane, were formed, and primary bodies of compacts each formed of a reinforcing material for the cloth members and a ceramic matrix consisting of an inorganic substance containing Si, C, O, and Zr were made (a sixth step).

Then, after making secondary bodies of the compacts by repeating the fifth step and the sixth step again using the primary bodies of the compacts, as illustrated in FIG. 3, in order to make an embedded body embedded in a lattice pattern in a later step, a plurality of cuts (slits each having a length L1/2 or L2/2 of 160 mm, a width T1 or T2 of 4 mm, and a thickness of 3 mm) were made in the secondary bodies of the compacts, and the secondary bodies each having the cuts of the compacts were made (a seventh step). Next, by using the secondary bodies each having the cuts of the compacts, in order to achieve further enhancement in density, the fifth step and the sixth step were repeated three more times, and compacts (having cuts, completed bodies) each formed of a reinforcing material for the cloth members (the non-woven fabric composed of a conjugated inorganic fiber) and the ceramic matrix consisting of the inorganic substance containing Si, C, O, and Zr, which are inorganic products obtainable by pyrolyzing poly-zirconocarbosilane, were made (an eighth step).

The compacts obtained in the eighth step were tied to each other by two stainless wire gauzes to be anode electrodes, and the tied compacts were arranged in between two pieces of C/C composite cathode electrodes arranged opposed to each other with a distance in between inside a bathtub where a dispersion solution (to which 100 parts of ethanol, 2.5 parts of fine powder of $Y_2SiO_5$, 0.02 parts of cyclohexanol-based dispersant, and 0.02 parts of polyvinyl butyral as a binder were added and on which ultrasonic dispersion was performed for preparation) in which a powder (particle diameter of 1 μm or less) of yttrium monosilicate ($Y_2SiO_5$) which is a solid solution oxide had been homogeneously dispersed in an ethanol solvent was retained. Then, at 25° C., direct voltage of 100 V was applied from a direct current stabilizing power supply for 30 minutes, and the powder of yttrium monosilicate was made to adhere to the surface of the compacts through electrophoresis (a ninth step).

After removing the compacts from the dispersion solution, draining the dispersion solution from the compacts, air drying the compacts for 2 hours, and hot-air drying the compacts in the atmosphere at 40° C. for 6 hours (a tenth step), in an argon gas atmosphere under a slightly increased pressure of 0.5 MPa, the compacts were heat-treated at 1400° C. for 3 hours, and the powder of yttrium monosilicate adhered to the surface of the compacts was sintered to make the powder firmly fixed to the compacts, and seven inorganic conjugated molded products (two having lengths L1 of 320 mm, widths W1 of 200 mm and thicknesses of 3 mm, and the other five having lengths L2 of 320 mm, widths W2 of 110 mm and thicknesses of 3 mm) each having an interior layer formed of a reinforcing material for a corresponding one of the cloth members (the non-woven fabric composed of a conjugated inorganic fiber) and the ceramic matrix consisting of the inorganic substance containing Si, C, O, and Zr, which are inorganic products obtainable by pyrolyzing poly-zirconocarbosilane, and an exterior layer which is a coverture for inorganic materials that consists of yttrium monosilicate for further durability enhancement were made (an eleventh step).

By embedding the seven inorganic conjugated molded products obtained in the eleventh step in a lattice pattern using the provided cuts as illustrated in FIG. 2 and fixing the embedded portions with an alumina-based heat-resistant adhesive agent, an apparatus for improving thermal efficiency of a heating device consisting of the inorganic conjugated molded products embedded in a lattice pattern was made. Next, as illustrated in FIGS. 1(A) and 1(B), from an aperture 24 provided at a bent section in the route for exhaust gas 15 communicated with the exhaust ports 14 at the hearth portion 13 of a high-temperature gas kiln (the heating device), the inorganic conjugated molded product 16 which is the apparatus for improving thermal efficiency of a heating device 10 was inserted in the route for exhaust gas 15 which is a pathway for heated gas, along the flow of heated gas. The high-temperature gas kiln is a gas kiln having an arched ceiling and provided with six (three pairs of) LPG venturi burners, and at the hearth portion 13, the exhaust ports 14 having widths of 19 to 29 mm and lengths of, for example, 200 mm to 450 mm are arranged side by side with one another. Heated gas in the furnace flows into the route for exhaust gas 15 through the exhaust ports 14, and after passing the inorganic conjugated molded product 16, the heated gas passes through a manual damper 23 provided on the downstream side of the route for exhaust gas 15 and becomes released to the outside. In-furnace pressure becomes fine-tuned by the manual damper 23.

In a test to confirm the improvement in thermal efficiency due to an inorganic conjugated molded product in the operation of a high-temperature gas kiln, it took 7.2 hours for the in-furnace temperature to rise from room temperature to an indication of 1200° C., the high-temperature gas kiln was operated for 4 hours with the in-furnace temperature in a state of being at a constant temperature of 1200° C., and an amount of LPG consumption was compared with that in the case where the inorganic conjugated molded product is not attached. The total amount of LPG consumption in the case where an inorganic conjugated molded product was attached was 10080 liters (momentary average flow rate of LPG gas was 15 liters/min.), and the total amount of LPG consumption in the case where the inorganic conjugated molded product was not attached was 11424 liters (momentary average flow rate of LPG gas was 17 liters/min.). From this result, it was found that by the attachment of the inorganic conjugated molded product, LPG consumption rate can be reduced by approximately 11.8%, and the inorganic conjugated molded product shows a remarkable thermal-efficiency improving effect in a heating device.

In the ten subsequent confirmation tests in the same operation, almost the same results were obtained, and no deterioration was found in the inorganic conjugated molded product collected after the ten confirmation tests, which made sure that the inorganic conjugated molded product is capable of maintaining a stable performance for a long period of time even at a temperature as high as 1200° C.

Experimental Example 2

A cloth member having a length of 200 mm, a width of 60 mm and a thickness of 0.33 mm and two cloth members each having a length of 200 mm, a width of 30 mm and a thickness of 0.33 mm were cut out from a plain weave fabric (having a textile weight of 289 g/m$^2$, a width of 500 mm, a thickness of 0.33 mm, and a length of 5 m and rolled in a roll-shape) composed of a heat-resistant inorganic fiber formed of an inorganic substance containing Si, C, and O (a first step). Then, after soaking the cloth members at room temperature in a solution in which 20 wt % each of perhydropolysilazane, (—Si(H$_2$)—NH—)$_n$ had been homogeneously dissolved in a xylene solvent, the cloth members were taken out from the solution, and dried in a nitrogen gas atmosphere at 150° C. for 2 hours to remove the xylene solvent contained in the cloth members. The cloth members from which the xylene solvent was removed were burned in the nitrogen gas atmosphere at 1200° C. for an hour, and a Si—N-based (containing a slight amount of O) inorganic material (an amorphous inorganic substance consisting of Si and N, and/or Si$_3$N$_4$ fine crystals) was made to coat the surface of the heat-resistant inorganic fiber composing the plain weave fabric which is the cloth members (a second step).

After soaking, under room temperature, the cloth members (the plain weave fabric composed of the heat-resistant inorganic fiber coated with the Si—N-based inorganic material) obtained in the second step in a solution in which 30 wt % of polycarbosilane was homogeneously dissolved in a xylene solvent, the cloth members were taken out from the solution and dried in a nitrogen gas atmosphere at 150° C. for two hours to remove the xylene solvent contained in the cloth members, and three cloth members containing (containing in voids in the cloth members) polycarbosilane were made (a third step). Next, by burning the cloth members containing polycarbosilane in an argon gas atmosphere at 1300° C. for an hour, and forming ceramics consisting of Si, C, and O which are inorganic products obtainable by pyrolyzing polycarbosilane, primary bodies of a compact formed by a reinforcing material for the cloth members and a ceramic matrix consisting of an inorganic substance containing Si, C, and O were made (a fourth step).

Figure 4:
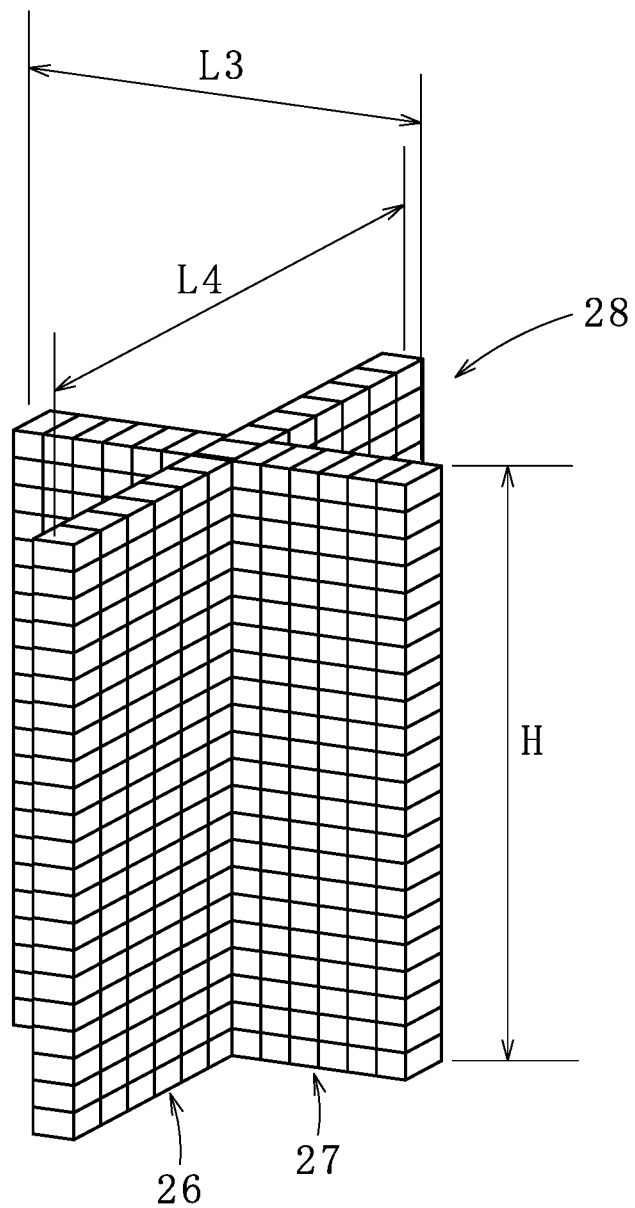
FIG. 4 is an explanatory diagram of an inorganic conjugated molded product to be used as an apparatus for improving thermal efficiency of a heating device according to an experimental example 2.

By using the primary bodies of the compact obtained in the fourth step, in order to achieve further enhancement in the density, a compact (a completed body) formed of a reinforcing material for the cloth members (the plain weave fabric composed of an inorganic fiber coated with a Si—N-based inorganic material) and the ceramic matrix consisting of the inorganic substance containing Si, C, and O which are inorganic products obtainable by pyrolyzing polycarbosilane were made by repeating the third step and the fourth step two more times (a fifth step). Next, by using the compact obtained in the fifth step, processing in the exact same manner as that in the ninth step and the tenth step in the experimental example 1 except that zircon (also referred to as zirconium monosilicate, ZrSiO$_4$) which is a solid solution oxide was used in place of the powder of yttrium monosilicate (Y$_2$SiO$_4$), a solid solution oxide, used in the experimental example 1 (a sixth step and a seventh step), and by further processing in the exact same manner as that in the eleventh step in the experimental example 1 except that heat treatment is performed at 1500° C. for 0.5 hours instead of performing at 1400° C. for three hours as in the eleventh step in the experimental example 1, three flat-plate-shaped objects (one having a length of 200 mm, a width of 60 mm and a thickness of 0.2 mm, the other two each having a length of 200 mm, a width of 30 mm and a thickness of 0.2 mm) each consisting of a multilayer structure of which an interior layer is formed by a reinforcing material for the cloth members (the plain weave fabric composed of the inorganic fiber coated with the Si—N-based inorganic material) and the ceramic matrix consisting of the inorganic substance containing Si, C, and O which are inorganic products obtainable by pyrolyzing polycarbosilane and of which an exterior layer consists of a coverture for inorganic materials that consists of zircon for further durability enhancement were made (an eighth step). Then, as illustrated in FIG. 4, by the three flat-plate-shaped objects obtained in the eighth step each forming an inorganic conjugated molded product embedded into a cross-shaped lattice pattern by means of wire gauzes 26 and 27 of a heat-resistant iron-chromium wire (a wire diameter of 1 mm, 15 meshes), an apparatus for improving thermal efficiency of a heating device 28 was made (a ninth step). Here, lengths of L3 and L4 are, for example, 60 mm, and a length of H is, for example, 200 mm.

Figure 5:
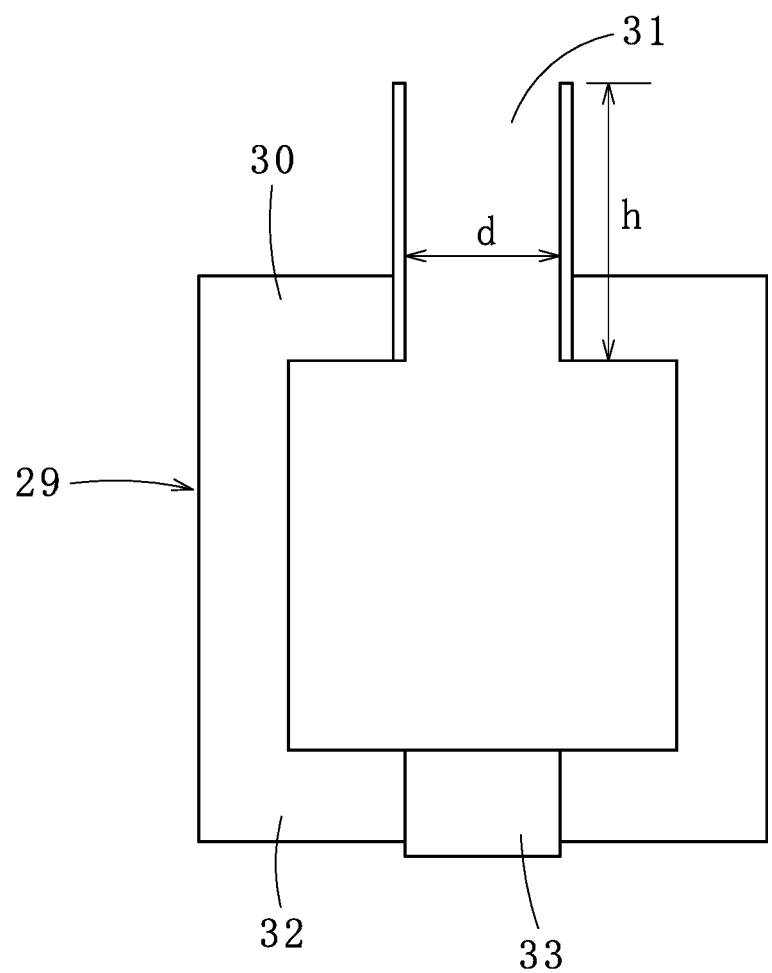
FIG. 5 is a cross-sectional view of a heating furnace to which an inorganic conjugated molded product becomes attached.
Figure 6:
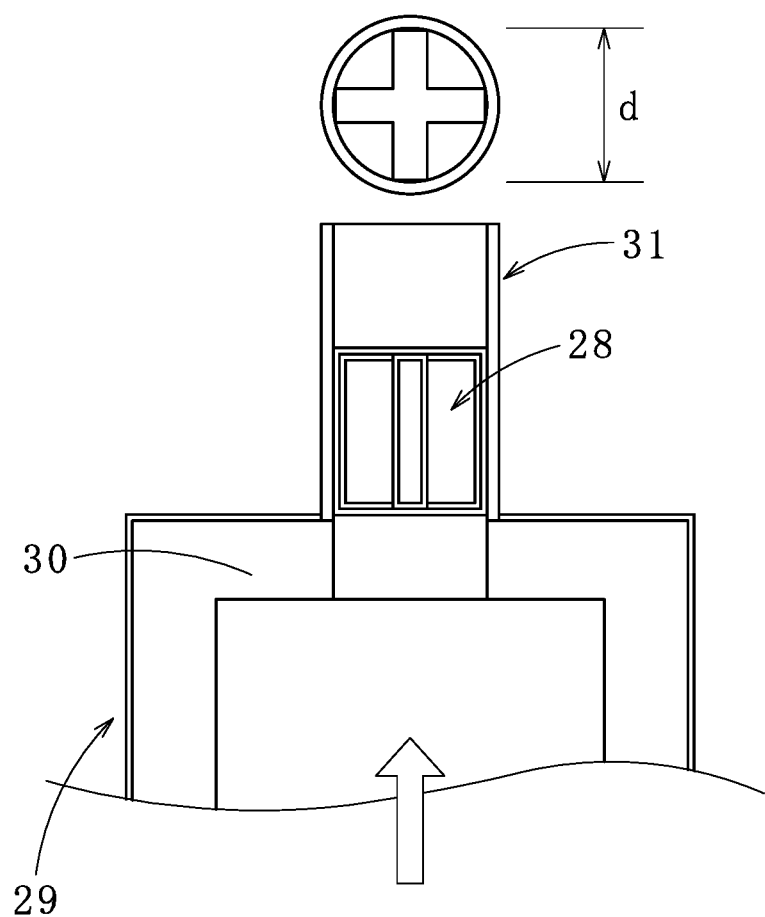
FIG. 6 is an explanatory diagram illustrating an attached state of an inorganic conjugated molded product.

The apparatus for improving thermal efficiency of a heating device 28 formed of the inorganic conjugated molded product obtained was, as illustrated in FIGS. 5 and 6, inserted from an entrance side (in-furnace side) of an exhaust port 31 formed in the center of a ceiling portion 30 of an electric furnace 29 and having an inside diameter d of 60 mm and a height h of, for example, 450 mm, and in order to keep the inorganic conjugated molded product from being dislocated and coming off, the apparatus for improving thermal efficiency of a heating device 28 was attached (attached in a manner that makes one end of the inorganic conjugated molded product fit precisely with the entrance position of the exhaust port 31) while adjusting the conditions of the iron-chromium wire gauzes 26 and 27 holding the inorganic conjugated molded product in between.

In order to confirm the thermal-efficiency improving effect of the apparatus for improving thermal efficiency 28 formed of the inorganic conjugated molded product installed inside the exhaust port 31 in the electric furnace 29, the electric furnace 29 was maintained (controlled by the temperature at a central portion of the electric furnace) at 800° C. at all times, and air was flown into the electric furnace 29 from an air insertion slot 33 formed at a central portion of the hearth 32 of the electric furnace 29 at a flow rate of 1 liter/minute for 10 hours, and a rate of reduction in electricity consumption W1 in the electric furnace 29 at that time was studied. Here, provided that an amount of electricity consumption required to keep the electric furnace 29 at a constant temperature of 800° C. while making air flow from the air insertion slot 33 at the central portion of the hearth 32 into the electric furnace 29 at a flow rate of 1 liter/minute without installing the apparatus for improving thermal efficiency inside the exhaust port 31 in the electric furnace 29 is represented by P0, a rate of reduction in electricity consumption P1 was calculated by $100 \times (P0-P1)/P0$. When the apparatus for improving thermal efficiency 28 was installed, as compared with the case of not installing it, the rate of reduction in electricity consumption indicated a value of 12%. This reduction rate did not change and remained constant for 10 hours. The fact that the inorganic conjugated molded product has an excellent radiation-heat radiation action was thereby confirmed, suggesting a large contribution to energy saving in the operation of the electric furnace 29, and a large contribution to a reduction in generation of $CO_2$ as a consequence.

Experimental Example 3

A base material having a length of 200 mm, a width of 60 mm and a thickness of 5 mm and two base materials each having a length of 200 mm, a width of 30 mm and a thickness of 5 mm were made by cutting a non-woven fabric (having a fiber diameter of 11 μm, a textile weight of 240 g/m², and a void fraction of 95%, containing 20% by mass of a rayon fiber which is an example of chemical fibers, and rolled in a roll shape of 500 mm in width, 5 mm in thickness and 10 m in length) composed of a heat-resistant inorganic fiber formed of an inorganic substance containing Si, C, O, and Ti. Then, the base materials were set up in a heat treatment furnace, and heat-treated in an argon gas atmosphere at 800° C. for an hour to decompose and remove part of the rayon fiber contained in the base materials (the non-woven fabric), carbonize the remainder, and at the same time, remove a sizing agent (an organic matter) on the base materials (a first step).

The heat-treated base materials were made to be tied to one another by means of two stainless wire gauzes that were to be anode electrodes, and the base materials made to be tied to one another were arranged in between two C/C composite cathode electrodes arranged opposed to each other with a distance in between inside a bathtub in which a dispersion solution (to which 100 parts of ethanol, 2.5 parts of zircon powder, 0.02 parts of cyclohexanol-based dispersant, and 0.02 parts of polyvinyl butyral as a binder were added and on which ultrasonic dispersion was performed for preparation) in which a powder (a particle diameter of 1 μm or less) of zircon (also referred to as zirconium monosilicate, $ZrSiO_4$) which is a solid solution oxide consisting of the elements of Si and Zr selected from the first group had been homogeneously dispersed in an ethanol solvent was retained. Then, at 25° C., direct voltage of 100 V was applied from a direct current stabilizing power supply for 30 minutes, and by means of electrophoresis, the powder of zircon was made to adhere to the outside of the heat-resistant inorganic fiber composing the non-woven fabric forming the base materials (a second step).

After taking the base materials out of the dispersion solution, draining the solution from the base materials, air-drying the base materials for two hours, and hot-air drying the base materials in the atmosphere at 40° C. for 6 hours (a third step), by heat-treating the base materials in an argon gas atmosphere under a slight pressure of 0.5 MPa at 1500° C. for 0.5 hours, and making the powder of zircon having been made to adhere to the outside of the heat-resistant inorganic fiber sintered to be firmly fixed to the heat-resistant inorganic fiber, the heat-resistant inorganic fiber was changed to a conjugated inorganic fiber having an inner shell structure (composed of an inorganic substance containing Si, C, O, and Ti) and an outer shell structure (zircon having a thickness of 2 μm), and three cloth members (one having a length of 200 mm, a width of 60 mm and a thickness of 5 mm, the other two each having a length of 200 mm, a width of 30 mm and a thickness of 5 mm) consisting of a non-woven fabric composed of the conjugated inorganic fiber were made (a fourth step).

After soaking, under room temperature, the cloth members in a solution in which 30 wt % of polytitano carbosilane was homogeneously dissolved in a xylene solvent, the cloth members were taken out of the solution and dried in a nitrogen gas atmosphere at 150° C. for two hours to remove the xylene solvent contained in the cloth members, and three cloth members containing (containing in voids in the cloth members) polytitano carbosilane were made (a fifth step). Next, by heat-treating the cloth members containing polytitano carbosilane in an argon gas atmosphere at 1300° C. for an hour, and producing an inorganic substance containing Si, C, O, and Ti which are inorganic products obtainable by pyrolyzing polytitano carbosilane, primary bodies of a compact formed of a reinforcing material for the cloth members and a ceramic matrix consisting of the inorganic substance containing Si, C, O, and Ti were made (a sixth step).

Using the primary bodies of the compact, in order to achieve further enhancement in density, a compact (a completed body) formed of a reinforcing material for the cloth members (the non-woven fabric composed of the conjugated inorganic fiber) and a ceramic matrix consisting of the inorganic substance containing Si, C, O, and Ti which are inorganic products obtainable from pyrolyzing polytitano carbosilane were made by repeating the fifth step and the sixth step four more times (a seventh step). Next, by using the compact obtained in the seventh step, and conducting in the exact same manner as the ninth to eleventh step in the experimental example 1, three (one having a length of 200 mm, a width of 60 mm and a thickness of 3 mm, the other two each having a length of 200 mm, a width of 30 mm and a thickness of 3 mm) inorganic conjugated molded products each consisting of a multilayer structure of which an interior layer is formed by the reinforcing material for the cloth members (the non-woven fabric composed of the conjugated inorganic fiber) and the ceramic matrix consisting of the inorganic substance containing Si, C, O, and Ti which are inorganic products obtainable by pyrolyzing polytitano carbosilane, and of which an exterior layer is a coverture for inorganic materials that consists of yttrium monosilicate for further durability enhancement were made (an eighth step).

An apparatus for improving thermal efficiency of a heating device consisting of an inorganic conjugated molded product embedded in a cross-shaped lattice pattern was made from the three inorganic conjugated molded products obtained in the eighth step by processing in the same manner as the ninth step in the experimental example 2 (a ninth step). A test to confirm the effect of the apparatus for improving thermal efficiency was performed in the exact same manner as that in the experimental example 2 except that the electric furnace was kept at a constant temperature of 1200° C. instead of the constant temperature of 800° C. of the experimental example 2, and except that air was flown into the electric furnace for 300 hours instead of the 10 hours of the experimental example 2. In this test, in the case of installing the apparatus for improving thermal efficiency, as compared with the case of not installing it, the rate of reduction in electricity consumption indicated a value higher by 20%, and this reduction rate did not change and remained constant throughout the 300 hours, which enabled a confirmation that the inorganic conjugated molded product embedded in a crossed shape has an excellent radiation-heat radiation action, suggesting a large contribution to energy saving in the operation of the electric furnace, and a large contribution to a reduction in generation of $CO_2$ as a consequence. When the inorganic conjugated molded product collected after the test was observed, changes such as deterioration were not found, which led to a confirmation that the inorganic conjugated molded product is capable of maintaining a constant performance for a long period of time under a temperature as high as 1200° C.

The descriptions have been given hereinbefore on the present invention with reference to the embodiments. However, the present invention is not limited to the structures described in the above embodiments, and also includes other embodiments and variations conceivable within the scope of matters described in the scope of claims. Additionally, the present invention also includes those in which the constituent elements included in the present embodiments and constituent elements included in other embodiments and variations are combined.

For example, in the present embodiments, a non-oxide-based heat-resistant inorganic fiber was used, however, a heat-resistant inorganic fiber composed of an inorganic substance containing Al, Si, and O can also be used.

INDUSTRIAL APPLICABILITY

Since heat that flows out from a heating device to the outside becomes reduced by heating an inorganic conjugated molded product with heated gas and putting radiation heat from the heated inorganic conjugated molded product back into the heating device, efficiency of the heating device can be enhanced, and energy loss can be reduced.

REFERENCE SIGNS LIST

10: apparatus for improving thermal efficiency of a heating device, 11: heating furnace, 12: heating chamber, 13: hearth portion, 14: exhaust port, 15: route for exhaust gas, 16: inorganic conjugated molded product, 17, 18: flat-plate-shaped object, 19, 20: cut, 23: manual damper, 24: aperture, 26, 27: wire gauze, 28: apparatus for improving thermal efficiency of a heating device, 29: electric furnace, 30: ceiling portion, 31: exhaust port, 32: hearth, 33: air insertion slot

The invention claimed is:

1. A method for the improving thermal efficiency of a heating device, comprising:

installing a heat-resistant inorganic conjugated molded product in and along a pathway for heated gas generated from a heating device within a flow of heated gas passing the pathway;

heating the inorganic conjugated molded product with the heated gas;

putting back into the heating device radiation heat from the heated inorganic conjugated molded product; and reducing an amount of heat that flows out from the heating device to the outside, the inorganic conjugated molded product being provided with an interior layer and an exterior layer, the exterior layer being formed of a coverture for inorganic materials that protects the interior layer from heated gas, wherein the interior layer is formed by a reinforcing material and a ceramic matrix, and the ceramic matrix is any one of the group consisting of an inorganic product obtained by pyrolyzing polymetallocarbosilane, an inorganic product obtained by pyrolyzing polycarbosilane, a pyrolysate of polyaluminocarbosilane, a pyrolysate of polycarbosilane, a product of carbonization reaction between molten silicon and carbon, a product of carbonization reaction between molten silicon and a carbon compound, a product of sintering reaction of a SiC fine powder containing a sintering additive, an inorganic product obtained by pyrolyzing a silazane-based polymer containing Si and N, and products of sintering reaction of a $Si_3N_4$ fine powder containing a sintering additive.

2. The method for improving thermal efficiency of a heating device according to claim 1, wherein the reinforcing material is formed of a heat-resistant inorganic fiber, the ceramic matrix is filled in voids in the reinforcing material, and the reinforcing material is formed having a cloth member or a processed fiber product.

3. The method for improving thermal efficiency of a heating device according to claim 2, wherein the inorganic conjugated molded product is 1) a flat plate body, 2) a disk body, 3) an embedded body formed by embedding a plurality of flat-plate-shaped objects in a lattice pattern in planar view, 4) a cylindrical body, 5) a hollow circular-truncated-cone body, 6) a hollow polygonal columnar body, or 7) a structural body having wing-shaped members.

4. The method for improving thermal efficiency of a heating device according to claim 2, wherein the cloth member is made from a woven fabric having a thickness of 0.2 mm or more and 10 mm or less and an aperture ratio of 30% or less, and the woven fabric is any one of a plain weave, satin weave, twill weave, three-dimensional weave, and multiaxial weave.

5. The method for improving thermal efficiency of a heating device according to claim 2, wherein the cloth member is made from a non-woven fabric having a thickness of 1 mm or more and 10 mm or less and a void fraction of 50% or more and 97% or less.

6. The method for improving thermal efficiency of a heating device according to claim 2, wherein the cloth member is formed of a laminated product of cloth materials that is made by overlapping one or both of woven fabrics each having a thickness of 0.2 mm or more and 10 mm or less and an aperture ratio of 30% or less and non-woven fabrics each having a thickness of 1 mm or more and 10 mm or less and a void fraction of 50% or more and 97% or less.

7. The method for improving thermal efficiency of a heating device according to claim 2, wherein
the processed fiber product is a laminated product in which long fibers consisting of the heat-resistant inorganic fiber are parallelly aligned in one direction, or short fibers consisting of the heat-resistant inorganic fiber and having lengths of 1 to 70 mm.

8. The method for improving thermal efficiency of a heating device according to claim 2, wherein
the heat-resistant inorganic fiber is a conjugated inorganic fiber provided with a multilayer structure having an inner shell structure and an outer shell structure,
provided that each element of the following is in a first group: Al; Ti; Cr; Fe; Si; Co; Ni; Cu; Y; Zr; Nb; Tc; Ru; Rh; Pd; Ag; La; Ce; Pr; Nd; Pm; Sm; Eu; Gd; Tb; Dy; Ho; Er; Tm; Yb; Lu; Hf; Ta; Re; and Os, the outer shell structure is composed of a material A consisting of any one of (1) an oxide of one element selected from the first group, (2) a complex oxide consisting of two or more elements selected from the first group, (3) a solid solution oxide made of two or more elements selected from the first group, (4) the oxide and the complex oxide, (5) the oxide and the solid solution oxide, (6) the complex oxide and the solid solution oxide, and (7) the oxide, the complex oxide, and the solid solution oxide,
a value of thermal expansion coefficient of an inorganic substance forming the outer shell structure is within the range of $\square$10% of a value of thermal expansion coefficient of an inorganic substance forming the inner shell structure, and
a thickness of the outer shell structure is 0.2 μm or more and 10 μm or less.

9. The method for improving thermal efficiency of a heating device according to claim 8, wherein
provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide composing the outer shell structure is of one or more of the following general formulae: $Q_2Si_2O_7$; $QSiO_5$; $R_3Al_5O_{12}$; and $RAlO_3$.

10. The method for improving thermal efficiency of a heating device according to claim 8, wherein
provided that one metal composition to be selected from Ti, Zr, and Al is represented by Me, the inner shell structure is composed of an inorganic substance containing Si, C, O, and Me.

11. The method for improving thermal efficiency of a heating device according to claim 8, wherein
provided that one metal composition to be selected from Ti, Zr, and Al is represented by Me, one metal composition to be selected from Ti and Zr, by Ms, and a carbide of the Ms, by MsC, the inner shell structure is composed of an aggregate of crystalline ultrafine particles and an amorphous inorganic substance, the crystalline ultrafine particles containing 1) β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles.

12. The method for improving thermal efficiency of a heating device according to claim 8, wherein
the inner shell structure is composed of an amorphous inorganic substance containing Si, C, and O.

13. The method for improving thermal efficiency of a heating device according to claim 8, wherein
the inner shell structure is composed of an aggregate of crystalline ultrafine particles of β-SiC having a particle diameter of 700 nm or less and an amorphous inorganic substance containing Si, C, and O, the Si, C, and O existing between the crystalline ultrafine particles.

14. The method for improving thermal efficiency of a heating device according to claim 8, wherein
the inner shell structure is composed of a crystalline inorganic substance consisting of fine crystals of β-SiC.

15. The method for improving thermal efficiency of a heating device according to claim 8, wherein
an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 μm exists between the inner shell structure and the outer shell structure of the conjugated inorganic fiber.

16. The method for improving thermal efficiency of a heating device according to claim 2, wherein
provided that one metal composition to be selected from Ti, Zr, and Al is represented by Me, the heat-resistant inorganic fiber is composed of an inorganic substance containing Si, C, O, and Me.

17. The method for improving thermal efficiency of a heating device according to claim 16, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

18. The method for improving thermal efficiency of a heating device according to claim 2, wherein
the heat-resistant inorganic fiber is composed of an inorganic substance containing Si, C, and O.

19. The method for improving thermal efficiency of a heating device according to claim 18, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

20. The method for improving thermal efficiency of a heating device according to claim 2, wherein
the heat-resistant inorganic fiber is composed of a crystalline inorganic substance consisting of fine crystals of β-SiC.

21. The method for improving thermal efficiency of a heating device according to claim 20, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

22. The method for improving thermal efficiency of a heating device according to claim 2, wherein
the heat-resistant inorganic fiber is composed of an inorganic substance containing Al, Si, and O.

23. The method for improving thermal efficiency of a heating device according to claim 22, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

24. The method for improving thermal efficiency of a heating device according to claim 2, wherein
the ceramic matrix is the inorganic product obtained by pyrolyzing polymetallocarbosilane, and
provided that one metal composition to be selected from Ti, Zr, and Al is represented by Md, the ceramic matrix is composed of an inorganic substance containing Si, C, O, and Md.

25. The method for improving thermal efficiency of a heating device according to claim 2, wherein
the ceramic matrix is the inorganic product obtained by pyrolyzing polymetallocarbosilane, and
provided that one metal composition to be selected from Ti, Zr, and Al is represented by Md, one metal composition to be selected from Ti and Zr is represented by Mp, and a carbide of the Mp is represented by MpC, the ceramic matrix is composed of an aggregate of crystalline ultrafine particles and an amorphous inorganic substance, the crystalline ultrafine particles containing 1) β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles.

26. The method for improving thermal efficiency of a heating device according to claim 2, wherein
the ceramic matrix is the inorganic product obtained by pyrolyzing polycarbosilane, and is composed of an aggregate of crystalline ultrafine particles of β-SiC having a particle diameter of 700 nm or less and an amorphous inorganic substance containing Si, C, and O, the Si, C, and O existing between the crystalline ultrafine particles, or is composed of an amorphous inorganic substance consisting of Si, C, and O.

27. The method for improving thermal efficiency of a heating device according to claim 2, wherein
the ceramic matrix is any one of the pyrolysate of polyaluminocarbosilane, the pyrolysate of polycarbosilane, the product of carbonization reaction between molten silicon and carbon, the product of carbonization reaction between molten silicon and the carbon compound, and the product of sintering reaction of the SiC fine powder containing the sintering additive, and is composed of a crystalline inorganic substance consisting of fine crystals of β-SiC.

28. The method for improving thermal efficiency of a heating device according to claim 2, wherein
the ceramic matrix is either 1) the inorganic product obtained by pyrolyzing the silazane-based polymer containing Si and N, and composed of any one of a Si—N-based amorphous inorganic substance, a Si—N—O-based amorphous inorganic substance, $Si_3N_4$ crystalline ultrafine particles, the Si—N-based amorphous inorganic substance and the $Si_3N_4$ crystalline ultrafine particles, and the Si—N—O-based amorphous inorganic substance and the $Si_3N_4$ crystalline ultrafine particles, or 2) composed of $Si_3N_4$ crystalline ultrafine particles that are the products of sintering reaction of the $Si_3N_4$ fine powder containing the sintering additive.

29. The method for improving thermal efficiency of a heating device according to claim 1, wherein
provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the coverture for inorganic material that forms the exterior layer is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and
a thickness of the exterior layer is 0.2 μm or more and 10 μm or less.

30. The method for improving thermal efficiency of a heating device according to claim 29, wherein
provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide is of one or more of the following general formulae: $Q_2Si_2O_7$; $QSiO_5$; $R_3Al_5O_{12}$; and $RAlO_3$.

31. An apparatus for improving thermal efficiency of a heating device for use in the method for improving thermal efficiency of a heating device according to claim 1, the apparatus comprising:
the reinforcing material being formed of a heat-resistant inorganic fiber, and the ceramic matrix being filled in voids in the reinforcing material,
wherein
the reinforcing material further is formed having a cloth member or a processed fiber product.

32. The apparatus for improving thermal efficiency of a heating device according to claim 31, wherein
the inorganic conjugated molded product is 1) a flat plate body, 2) a disk body, 3) an embedded body in which a plurality of flat-plate-shaped objects are embedded in a lattice pattern in planar view, 4) a cylindrical body, 5) a hollow circular-truncated-cone body, 6) a hollow polygonal columnar body, or 7) a structural body having wing-shaped members.

33. The apparatus for improving thermal efficiency of a heating device according to claim 31, wherein
the cloth member is made of a woven fabric having a thickness of 0.2 mm or more and 10 mm or less and an aperture ration of 30% or less, and the woven fabric is any one of a plain weave, satin weave, twill weave, three-dimensional weave, and multiaxial weave.

34. The apparatus for improving thermal efficiency of a heating device according to claim 31, wherein
the cloth member is made of a non-woven fabric having a thickness of 1 mm or more and 10 mm or less and a void fraction of 50% or more and 97% or less.

35. The apparatus for improving thermal efficiency of a heating device according to claim 31, wherein
the cloth member is formed from a laminated product of cloth materials that is made by overlapping either one or both of woven fabrics and non-woven fabrics, the woven fabrics each having a thickness of 0.2 mm or more and 10 mm or less and an aperture ratio of 30% or less, the non-woven fabrics each having a thickness of 1 mm or more and 10 mm or less and a void fraction of 50% or more and 97% or less.

36. The apparatus for improving thermal efficiency of a heating device according to claim 31, wherein the processed fiber product is a laminated product in which long fibers consisting of the heat-resistant inorganic fiber are aligned parallel to one another in one direction, or short fibers consisting of the heat-resistant inorganic fiber and having lengths of 1 to 70 mm.

37. The apparatus for improving thermal efficiency of a heating device according to claim 31, wherein
the heat-resistant inorganic fiber is a conjugated inorganic fiber provided with a multilayer structure having an inner shell structure and an outer shell structure,
provided that each element of the following is in a first group: Al; Ti; Cr; Fe; Si; Co; Ni; Cu; Y; Zr; Nb; Tc; Ru; Rh; Pd; Ag; La; Ce; Pr; Nd; Pm; Sm; Eu; Gd; Tb; Dy; Ho; Er; Tm; Yb; Lu; Hf; Ta; Re; and Os, the outer shell structure is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide,
a value of thermal expansion coefficient of an inorganic substance forming the outer shell structure is within the range of ±10% of a value of thermal expansion coefficient of an inorganic substance forming the inner shell structure, and
a thickness of the outer shell structure is 0.2 μm or more and 10 μm or less.

38. The apparatus for improving thermal efficiency of a heating device according to claim 37, wherein
provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide is of one or more of the following general formulae: $Q_2Si_2O_7$; $QSiO_5$; $R_3Al_5O_{12}$; and $RAlO_3$.

39. The apparatus for improving thermal efficiency of a heating device according to claim 37, wherein
provided that one metal composition to be selected from Ti, Zr, and Al is represented by Me, the inner shell structure is composed of an inorganic substance containing Si, C, O, and Me.

40. The apparatus for improving thermal efficiency of a heating device according to claim 37, wherein
provided that one metal composition to be selected from Ti, Zr, and Al is represented by Me, one metal composition to be selected from Ti and Zr, by Ms, a carbide of the Ms, by MsC, the inner shell structure is composed of an aggregate of crystalline ultrafine particles and an amorphous inorganic substance, the crystalline ultrafine particles containing 1) β-SiC, 2) MsC, and 3) a solid solution of the β-SiC and the MsC, and/or $MsC_{1-x}$ (0<x<1), the crystalline ultrafine particles having a particle diameter of 700 nm or less, the amorphous inorganic substance containing Si, C, O, and Me, the Si, C, O, and Me existing between the crystalline ultrafine particles.

41. The apparatus for improving thermal efficiency of a heating device according to claim 37, wherein
the inner shell structure is composed of an amorphous inorganic substance containing Si, C, and O.

42. The apparatus for improving thermal efficiency of a heating device according to claim 37, wherein
the inner shell structure is composed of an aggregate of crystalline ultrafine particles of β-SiC having a particle diameter of 700 nm or less and an amorphous inorganic substance containing Si, C, and O, the Si, C, and O existing between the crystalline ultrafine particles.

43. The apparatus for improving thermal efficiency of a heating device according to claim 37, wherein
the inner shell structure is composed of a crystalline inorganic substance consisting of fine crystals of β-SiC.

44. The apparatus for improving thermal efficiency of a heating device according to claim 37, wherein
an intervening layer consisting of one or a combination of two or more of C, BN, $Si_3N_4$, a Si—N-based amorphous inorganic substance, and a Si—N—O-based amorphous inorganic substance and having a thickness of 0.1 to 3.0 μm exists between the inner shell structure and the outer shell structure of the conjugated inorganic fiber.

45. The apparatus for improving thermal efficiency of a heating device according to claim 31, wherein
provided that one metal composition to be selected from Ti, Zr, and Al is represented by Me, the heat-resistant inorganic fiber is composed of an inorganic substance containing Si, C, O, and Me.

46. The apparatus for improving thermal efficiency of a heating device according to claim 45, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

47. The apparatus for improving thermal efficiency of a heating device according to claim 31, wherein
the heat-resistant inorganic fiber is composed of an inorganic substance containing Si, C, and O.

48. The apparatus for improving thermal efficiency of a heating device according to claim 47, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

49. The apparatus for improving thermal efficiency of a heating device according to claim 31, wherein
the heat-resistant inorganic fiber is composed of a crystalline inorganic substance consisting of fine crystals of β-SiC.

50. The apparatus for improving thermal efficiency of a heating device according to claim 49, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

51. The apparatus for improving thermal efficiency of a heating device according to claim 31, wherein
the heat-resistant inorganic fiber is composed of an inorganic substance containing Al, Si, and O.

52. The apparatus for improving thermal efficiency of a heating device according to claim 51, wherein
the heat-resistant inorganic fiber has a covering layer consisting of one or a combination of two or more of C, BN, $Si_3N_4$, a Si—N-based amorphous inorganic substance, and a Si—N—O-based amorphous inorganic substance, and having a thickness of 0.1 to 3.0 μm.

53. The apparatus for improving thermal efficiency of a heating device according to claim 31, wherein the ceramic matrix is the inorganic product obtained by pyrolyzing polymetallocarbosilane, and provided that one metal composition to be selected from Ti, Zr, and Al is represented by Md, the ceramic matrix is composed of an inorganic substance containing Si, C, O, and Md.

54. The apparatus for improving thermal efficiency of a heating device according to claim 31, wherein the ceramic matrix is the inorganic product obtained obtainable by pyrolyzing polymetallocarbosilane, and provided that one metal composition to be selected from Ti, Zr, and Al is represented by Md, one metal composition to be selected from Ti and Zr, by Mp, and a carbide of the Mp, by MpC, the ceramic matrix is composed of an aggregate of crystalline ultrafine particles and an amorphous inorganic substance, the crystalline ultrafine particles containing 1) β-SiC, 2) MpC, and 3) a solid solution of the β-SiC and the MpC, and/or $MpC_{1-x}$ (0<x<1), the crystalline ultrafine particles having a particle diameter of 700 nm or less, the amorphous inorganic substance containing Si, C, O, and Md, the Si, C, O, and Md existing between the crystalline ultrafine particles.

55. The apparatus for improving thermal efficiency of a heating device according to claim 31, wherein the ceramic matrix is the inorganic product obtained by pyrolyzing polycarbosilane, and is composed of an aggregate of crystalline ultrafine particles of β-SiC having a particle diameter of 700 nm or less and an amorphous inorganic substance containing Si, C, and O, the Si, C, and O existing between the crystalline ultrafine particles, or is composed of an amorphous inorganic substance consisting of Si, C, and O.

56. The apparatus for improving thermal efficiency of a heating device according to claim 31, wherein the ceramic matrix is any one of the pyrolysate of polyaluminocarbosilane, the pyrolysate of polycarbosilane, the product of carbonization reaction between molten silicon and carbon, the product of carbonization reaction between molten silicon and a carbon compound, and the product of sintering reaction of the SiC fine powder containing the sintering additive, and is composed of a crystalline inorganic substance consisting of fine crystals of β-SiC.

57. The apparatus for improving thermal efficiency of a heating device according to claim 31, wherein the ceramic matrix is either 1) the inorganic product obtained by pyrolyzing the silazane-based polymer containing Si and N, and composed of any one of a Si—N-based amorphous inorganic substance, a Si—N—O-based amorphous inorganic substance, $Si_3N_4$ crystalline ultrafine particles, the Si—N-based amorphous inorganic substance and the $Si_3N_4$ crystalline ultrafine particles, and the Si—N—O-based amorphous inorganic substance and the $Si_3N_4$ crystalline ultrafine particles, or 2) composed of $Si_3N_4$ crystalline ultrafine particles which are the products of sintering reaction of the $Si_3N_4$ fine powder containing the sintering additive.

58. The apparatus for improving thermal efficiency of a heating device according to claim 31, wherein provided that each element of Al, Ti, Cr, Fe, Si, Co, Ni, Cu, Y, Zr, Nb, Tc, Ru, Rh, Pd, Ag, La, Ce, Pr, Nd, Pm, Sm, Eu, Gd, Tb, Dy, Ho, Er, Tm, Yb, Lu, Hf, Ta, Re, and Os is in a first group, the coverture for inorganic materials that forms the exterior layer is composed of a material A consisting of any one of (1) an oxide of one element selected from the first group, (2) a complex oxide consisting of two or more elements selected from the first group, (3) a solid solution oxide of two or more elements selected from the first group, (4) the oxide and the complex oxide, (5) the oxide and the solid solution oxide, (6) the complex oxide and the solid solution oxide, and (7) the oxide, the complex oxide, and the solid solution oxide, and a thickness of the exterior layer is 0.2 μm or more and 10 μm or less.

59. The apparatus for improving thermal efficiency of a heating device according to claim 58, wherein provided that each element of Y, Yb, Er, Ho, and Dy is in a second group, each element of Y, Yb, Er, Ho, Dy, Gd, Sm, Nd, and Lu is in a third group, at least one element selected from the second group is represented by Q, and at least one element selected from the third group is represented by R, the solid solution oxide is of one or more of the following general formulae: $Q_2Si_2O_7$; $QSiO_5$; $R_3Al_5O_{12}$; and $RAlO_3$.

* * * * *